US012787014B2

(12) United States Patent
Wang et al.

(10) Patent No.: US 12,787,014 B2
(45) Date of Patent: Nov. 3, 2026

(54) CONDITIONAL AND PROACTIVE GRANTS FOR SIDELINK COMMUNICATIONS

(71) Applicant: QUALCOMM Incorporated, San Diego, CA (US)

(72) Inventors: Xiaojie Wang, Hillsborough, NJ (US); Piyush Gupta, Bridgewater, NJ (US); Jing Sun, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 17/674,756

(22) Filed: Feb. 17, 2022

(65) Prior Publication Data

US 2023/0262716 A1 Aug. 17, 2023

(51) Int. Cl.

| | |
|---|---|
| ***H04W 72/23*** | (2023.01) |
| ***H04B 7/0452*** | (2017.01) |
| ***H04W 72/02*** | (2009.01) |
| ***H04W 72/21*** | (2023.01) |

(52) U.S. Cl.

CPC .......... *H04W 72/23* (2023.01); *H04B 7/0452* (2013.01); *H04W 72/02* (2013.01); *H04W 72/21* (2023.01)

(58) Field of Classification Search

CPC ..... H04W 72/02; H04W 72/21; H04W 72/23; H04W 72/40; H04B 7/0452; H04L 1/1887; H04L 1/1896

See application file for complete search history.

(56) References Cited

U.S. PATENT DOCUMENTS

| | | | | |
|---|---|---|---|---|
| 2016/0128093 | A1* | 5/2016 | Lee | H04W 72/23 370/329 |
| 2019/0364588 | A1* | 11/2019 | Lu | H04L 1/1887 |
| 2021/0026904 | A1* | 1/2021 | Ly | G06F 16/951 |
| 2021/0176734 | A1* | 6/2021 | You | H04W 40/22 |
| 2022/0116917 | A1* | 4/2022 | Zhao | H04W 72/044 |
| 2022/0240227 | A1* | 7/2022 | Lee | H04L 1/1825 |
| 2022/0264533 | A1* | 8/2022 | Zhang | H04L 1/1812 |
| 2022/0386325 | A1* | 12/2022 | Zhao | H04L 1/1893 |
| 2022/0400490 | A1* | 12/2022 | Ji | H04W 72/0453 |
| 2023/0309161 | A1* | 9/2023 | Rao | H04L 5/0048 |
| 2024/0163027 | A1* | 5/2024 | Lei | H04W 72/21 |
| 2024/0251426 | A1* | 7/2024 | Yang | H04W 28/26 |
| 2024/0251436 | A1* | 7/2024 | Ko | H04L 1/1812 |
| 2024/0267940 | A1* | 8/2024 | Yang | H04W 72/40 |

FOREIGN PATENT DOCUMENTS

| | | | | |
|---|---|---|---|---|
| CN | 113141664 A | * | 7/2021 | H04L 1/1812 |

* cited by examiner

*Primary Examiner* — Noel R Beharry
*Assistant Examiner* — Angelie T Ngo
(74) *Attorney, Agent, or Firm* — Seyfarth Shaw LLP

(57) ABSTRACT

A method for wireless communication performed by a first sidelink user equipment (UE) includes receiving, from a network entity, a sidelink grant allocating sidelink resources for communicating with a second sidelink UE. The method also includes transmitting, to the network entity via uplink resources, a feedback message based on whether one or both of a first sidelink packet condition or a second sidelink packet condition are satisfied. The method further includes transmitting, to the second sidelink UE via the sidelink resources, a sidelink packet based on both the first sidelink packet condition and the second sidelink packet being satisfied.

22 Claims, 16 Drawing Sheets

CONDITIONAL AND PROACTIVE GRANTS FOR SIDELINK COMMUNICATIONS

FIELD OF THE DISCLOSURE

The present disclosure relates generally to wireless communications, and more particularly to granting sidelink communication resources via one or both of a conditional sidelink grant or a proactive sidelink grant.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (for example, with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. Narrowband (NB)-IoT and enhanced machine-type communications (eMTC) are a set of enhancements to LTE for machine type communications. There exists a need for further improvements in 5G NR technology. These improvements may also be applicable to other multi-access technologies and the telecommunications standards that employ these technologies.

Wireless communications systems may include or provide support for various types of communications systems, such as vehicle related cellular communications systems (for example, cellular vehicle-to-everything (CV2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipment (UEs), such as vehicles, may communicate directly with each other using device-to-device (D2D) communications over a D2D wireless link. These communications can be referred to as sidelink communications.

In some examples, sidelink communication resources may be allocated from one or more resource pools based on one of two resource allocation modes. A base station scheduled mode, which may be referred to as Mode 1, is one of the two resource allocation modes. The other of the two modes, which is referred to as Mode 2, is a UE autonomous selection mode. In Mode 1, the UE may send a service request to the serving base station. The base station may then approve the service request and assign time-frequency resources for the sidelink communication.

SUMMARY

In one aspect of the present disclosure, a method for wireless communication performed by a first sidelink user equipment (UE) includes receiving, from a network entity, a sidelink grant allocating sidelink resources for communicating with a second sidelink UE. The method further includes transmitting, to the network entity via uplink resources, a feedback message based on whether one or both of a first sidelink packet condition or a second sidelink packet condition are satisfied. The method still further includes transmitting, to the second sidelink UE via the sidelink resources, a sidelink packet based on both the first sidelink packet condition and the second sidelink packet being satisfied.

Another aspect of the present disclosure is directed to an apparatus including means for receiving, from a network entity, a sidelink grant allocating sidelink resources for communicating with a second sidelink UE. The apparatus further includes means for transmitting, to the network entity via uplink resources, a feedback message based on whether one or both of a first sidelink packet condition or a second sidelink packet condition are satisfied. The apparatus still further includes means for transmitting, to the second sidelink UE via the sidelink resources, a sidelink packet based on both the first sidelink packet condition and the second sidelink packet being satisfied.

In another aspect of the present disclosure, a non-transitory computer-readable medium with non-transitory program code recorded thereon is disclosed. The program code is executed by a processor and includes program code to receive, from a network entity, a sidelink grant allocating sidelink resources for communicating with a second sidelink UE. The program code further includes program code to transmit, to the network entity via uplink resources, a feedback message based on whether one or both of a first sidelink packet condition or a second sidelink packet condition are satisfied. The program code still further includes program code to transmit, to the second sidelink UE via the sidelink resources, a sidelink packet based on both the first sidelink packet condition and the second sidelink packet being satisfied.

Another aspect of the present disclosure is directed to an apparatus for wireless communication at a sidelink UE. The apparatus includes a processor and a memory coupled with the processor and storing instructions operable, when executed by the processor, to cause the apparatus to receive, from a network entity via uplink resources, a sidelink grant allocating sidelink resources for communicating with a second sidelink UE. Execution of the instructions further cause the apparatus to transmit, to the network entity, a feedback message based on whether one or both of a first sidelink packet condition or a second sidelink packet condition are satisfied. Execution of the instructions also cause the apparatus to transmit, to the second sidelink UE via the sidelink resources, a sidelink packet based on both the first sidelink packet condition and the second sidelink packet being satisfied.

In one aspect of the present disclosure, a method for wireless communication performed by a first sidelink UE includes receiving, from a network entity, a sidelink grant allocating sidelink resources for a sidelink transmission to a second sidelink UE, the sidelink resources including sidelink channel resources, uplink channel resources, or downlink channel resources. The method further includes receiving, from the network entity, one or more resource conditions for using the sidelink resources allocated via the sidelink grant. The method still further includes transmitting, to the second sidelink UE via the sidelink resources, a sidelink packet based on satisfying the one or more resource conditions.

Another aspect of the present disclosure is directed to an apparatus including means for receiving, from a network entity, a sidelink grant allocating sidelink resources for a sidelink transmission to a second sidelink UE, the sidelink resources including sidelink channel resources, uplink channel resources, or downlink channel resources. The apparatus further includes means for receiving, from the network entity, one or more resource conditions for using the sidelink resources allocated via the sidelink grant. The apparatus still further includes means for transmitting, to the second sidelink UE via the sidelink resources, a sidelink packet based on satisfying the one or more resource conditions.

In another aspect of the present disclosure, a non-transitory computer-readable medium with non-transitory program code recorded thereon is disclosed. The program code is executed by a processor and includes program code to receive, from a network entity, a sidelink grant allocating sidelink resources for a sidelink transmission to a second sidelink UE, the sidelink resources including sidelink channel resources, uplink channel resources, or downlink channel resources. The program code further includes program code to receive, from the network entity, one or more resource conditions for using the sidelink resources allocated via the sidelink grant. The program code still further includes program code to transmit, to the second sidelink UE via the sidelink resources, a sidelink packet based on satisfying the one or more resource conditions.

Another aspect of the present disclosure is directed to an apparatus for wireless communication at a sidelink UE. The apparatus includes a processor and a memory coupled with the processor and storing instructions operable, when executed by the processor, to receive, from a network entity, a sidelink grant allocating sidelink resources for a sidelink transmission to a second sidelink UE, the sidelink resources including sidelink channel resources, uplink channel resources, or downlink channel resources. Execution of the instructions also cause the apparatus to receive, from the network entity, one or more resource conditions for using the sidelink resources allocated via the sidelink grant. Execution of the instructions further cause the apparatus to transmit, to the second sidelink UE via the sidelink resources, a sidelink packet based on satisfying the one or more resource conditions.

Aspects of the present disclosure generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying Figures. Each of the Figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9, 10, 11A, 11B, and 11C are block diagrams illustrating examples of wireless communication systems, in accordance with various aspects of the present disclosure.

DETAILED DESCRIPTION

Figure 1:
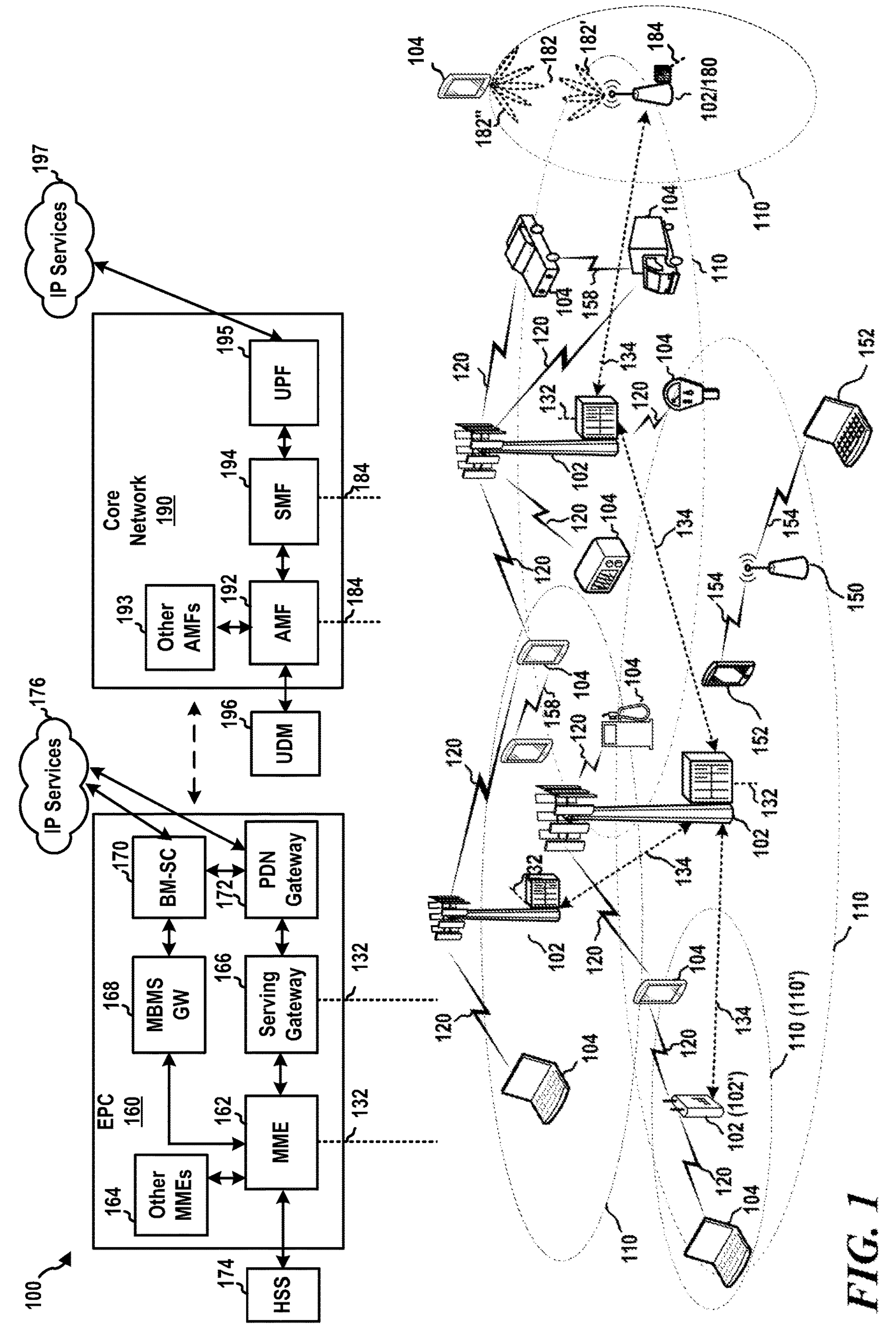
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (for example, without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

Sidelink communications refer to the communications among user equipment (UE) without tunneling through a base station or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a base station and a UE. For instance, the PSCCH may carry sidelink control information (SCI) and the PSSCH may carry sidelink data (for example, user data). Each PSCCH is associated with a corresponding PSSCH, where SCI in a PSCCH may carry reservation and/or scheduling information for a sidelink data transmission in the associated PSSCH. Use cases for sidelink communications may include, among others, vehicle-to-everything (V2X), industrial Internet of things (IoT) (IIoT), or new radio (NR)-lite.

In some examples, sidelink communication resources may be allocated from one or more receiving and transmitting resource pools based on one of two resource allocation modes. A base station scheduled mode, which may be referred to as Mode 1, is one of the two resource allocation modes. The other of the two modes, which is referred to as Mode 2, is a sidelink UE autonomous selection mode. In Mode 1, the sidelink UE may send a scheduling request to the serving base station. The base station may then transmit an uplink grant that allocates uplink resources for the sidelink UE to transmit a buffer status report (BSR) that indicates a buffer (for example, a sidelink packet transmission buffer) of the sidelink UE holding one or more sidelink packets. The base station may then transmit a sidelink grant allocating sidelink resources for transmitting the one or more sidelink packets. The base station may transmit the sidelink grant based on receiving the BSR. In Mode 1, a time period associated with transmitting the service request, receiving the uplink grant, transmitting the BSR, and receiving the sidelink grant may be greater than a packet delay budget (PDB) associated with one or more sidelink packets. Therefore, the process of sending the service request and receiving the sidelink grant may increase a latency of sidelink communications.

Additionally, in Mode 1, after assigning sidelink resources to a transmitting UE, the base station may be unaware of an intended destination for a sidelink transmission that uses the assigned sidelink resources. Because the base station does not know an identity of a sidelink receiver that will receive the sidelink transmission, the base station may be unable to manage interference caused by the sidelink transmission.

Various aspects of the present disclosure are directed to allocating sidelink resources via a sidelink grant. Some aspects more specifically relate to allocating sidelink resources via a proactive sidelink grant. In such aspects, a first sidelink UE may receive, from a base station, a proactive sidelink grant allocating sidelink resources for communicating with a second sidelink UE. In contrast to some sidelink grants that are received at the first sidelink UE in response to a scheduling request and a BSR, the first sidelink UE does not receive the proactive sidelink grant in response to the scheduling request and the BSR. Rather, the proactive sidelink grant may be independently transmitted by the base station. After receiving the proactive sidelink grant, the first sidelink UE may transmit, to the base station, a feedback message based on whether one or both a first sidelink packet condition or a second sidelink packet condition are satisfied. The first sidelink packet condition may be satisfied based on a sidelink packet being stored in a sidelink packet transmission buffer. The second sidelink packet condition may be satisfied based on the sidelink resources being capable of transmitting the sidelink packet based on a size of the sidelink packet. In some examples, the first sidelink UE transmits the feedback message based on one or both of the first sidelink packet condition or the second sidelink packet condition not being satisfied. In such examples, the base station may determine that the first sidelink UE intends to use the allocated sidelink resources when the feedback message is not transmitted. In other examples, the feedback message indicates that the first sidelink UE intends to use the allocated sidelink resources. In such examples, the first sidelink UE transmits the feedback message based on both the first sidelink packet condition and the second sidelink packet condition being satisfied. Additionally, in such examples, the base station may determine that the first sidelink UE does not intend to use the allocated sidelink resources when the feedback message is not transmitted. In some examples, the first sidelink UE transmits the sidelink packet to the second sidelink UE via the allocated sidelink resources based on both the first sidelink packet condition and the second sidelink packet being satisfied.

Some other aspects more specifically relate to receiving a conditional sidelink grant that allocates sidelink resources for a sidelink transmission to a second sidelink UE. The sidelink resources may be sidelink channel resources, uplink channel resources, or downlink channel resources. In some examples, the first sidelink UE may receive the conditional sidelink grant in response to a scheduling request and a BSR. The conditional sidelink grant may indicate one or more resource conditions for using the sidelink resources allocated by the conditional sidelink grant. After receiving the conditional sidelink grant, the first sidelink UE may transmit one or more sidelink packets to the second sidelink UE based on satisfying the one or more resource conditions. In some examples, the sidelink grant may be both a conditional sidelink grant and a proactive sidelink grant.

Particular aspects of the subject matter described in this disclosure may be implemented to realize one or more of the following potential advantages. In some examples, the described techniques may reduce an amount of latency associated with scheduling and transmitting the sidelink packet based on using a proactive sidelink grant. In such examples, the amount of latency may be reduced because a sidelink UE is not required to transmit a scheduling request and a BSR to a base station in order to receive the proactive sidelink grant from the base station. Additionally, the described techniques may manage interference caused by sidelink transmissions by using a conditional sidelink grant to allocate sidelink resources. In such examples, a base station may indicate one or more resource conditions for using the conditional sidelink grant, and the one or more resource conditions may be specified to reduce interference caused by sidelink transmissions.

D2D communications, such as sidelink communications, may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (for example, light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (for example, a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (for example, S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over backhaul links 134 (for example, X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (for example, 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (for example, macro base station), may include a NR BS, a Node B, a 5G node B, an eNB, a gNodeB (gNB), an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Some base stations, such as gNB F may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (for example, 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, it may be applicable to other similar areas, such as LTE, LTE-A, CDMA, GSM, and other wireless technologies.

Figures 2A, 2B, 2C, 2D:
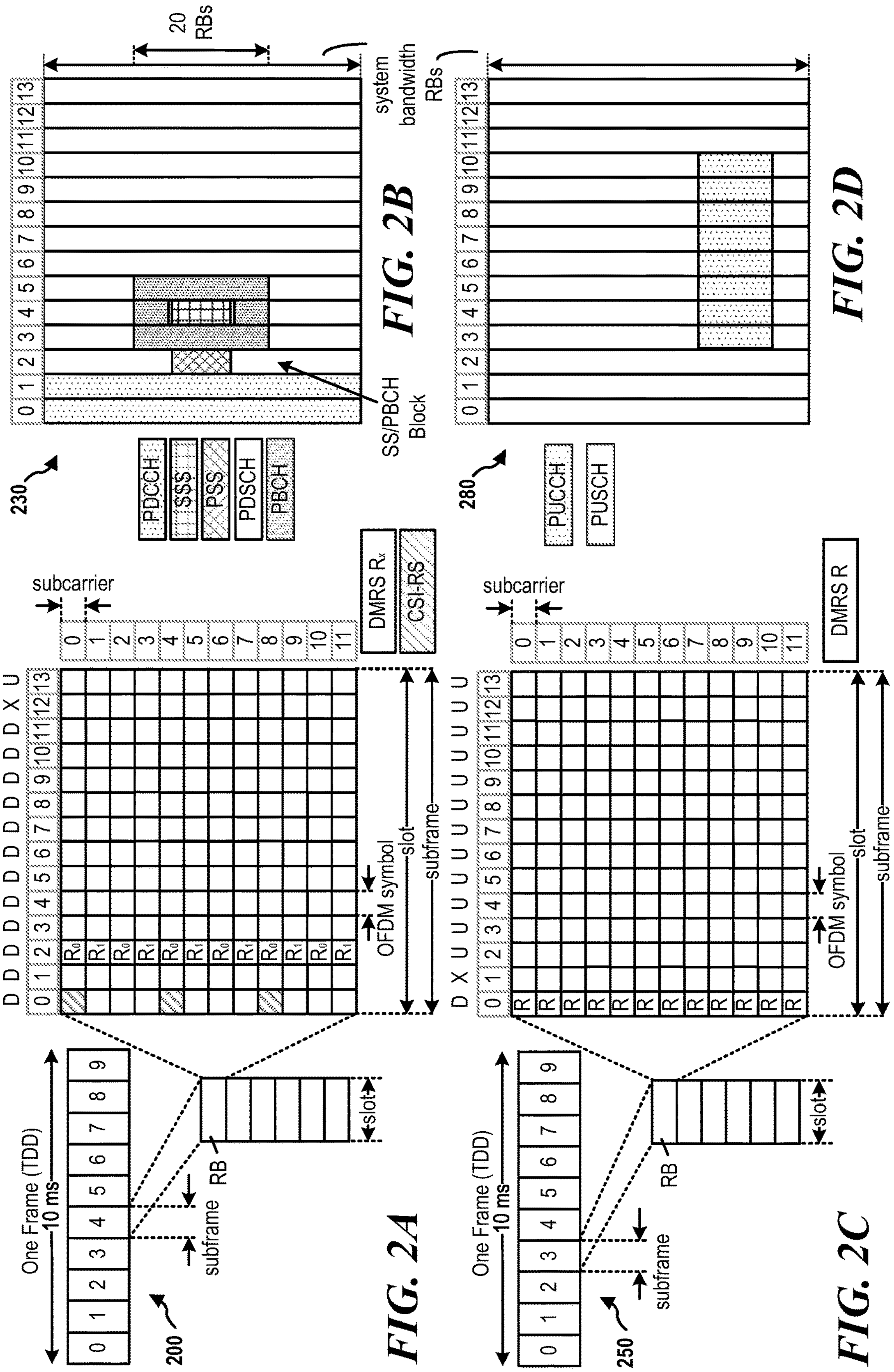
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to 2^μ*15 kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as Rx for one particular configuration, where 100*x* is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

Figure 3:
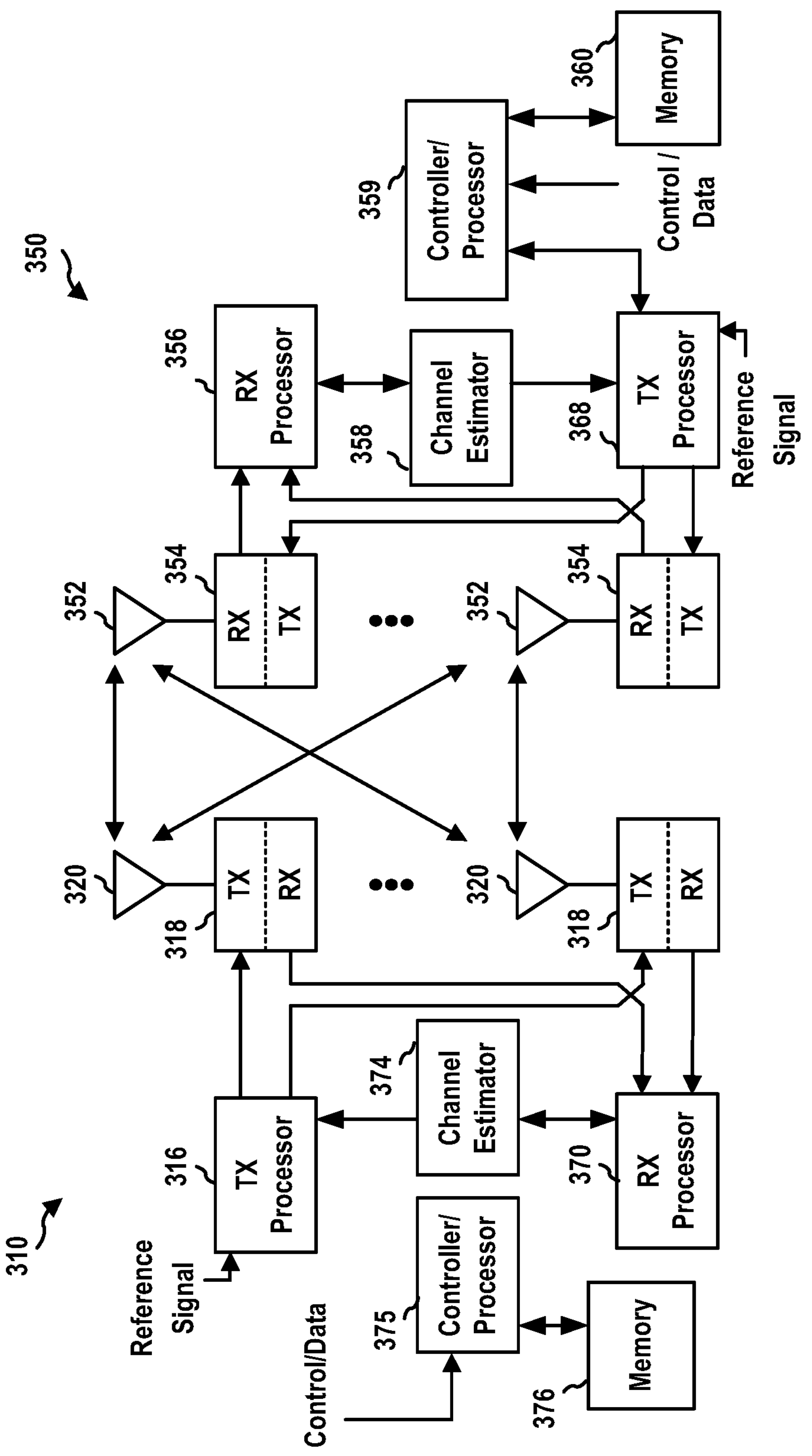
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (for example, MIB, SIBs), RRC connection control (for example, RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (for example, binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (for example, pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
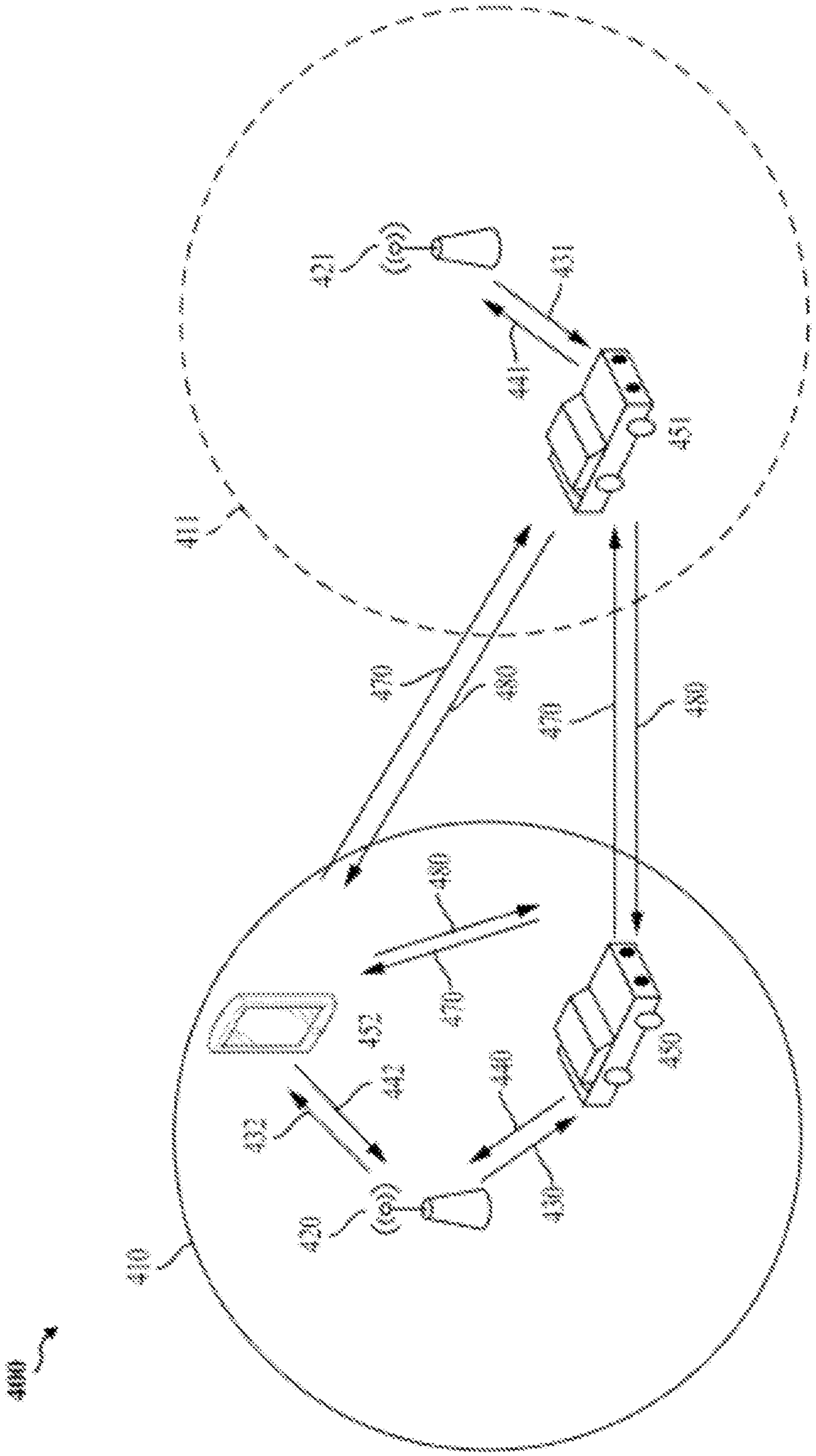
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure.

For example, the D2D communications system 400 may include V2X communications, (for example, a first UE 450 communicating with a second UE 451). In some aspects, the first UE 450 and/or the second UE 451 may be configured to communicate in a licensed radio frequency spectrum and/or a shared radio frequency spectrum. The first UE 450 and second UE 451 may be examples of a UE 104 described with reference to FIG. 1. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (for example, V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (for example, Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (for example, 5 GHz radio spectrum bands).

The shared radio frequency spectrum may be unlicensed, and therefore different technologies may use the shared radio frequency spectrum for communications. In some aspects, a D2D communications (for example, sidelink communications) between or among UEs 450, 451 is not scheduled by MNOs. The D2D communications system 400 may further include a third UE 452. The third UE 452 may be an example of a UE 104 described with reference to FIG. 1.

The third UE 452 may operate on the first network 410 (for example, of the first MNO) or another network, for example. The third UE 452 may be in D2D communications with the first UE 450 and/or second UE 451. The first base station 420 (for example, gNB) may communicate with the third UE 452 via a downlink (DL) carrier 432 and/or an uplink (UL) carrier 442. The DL communications may be use various DL resources (for example, the DL subframes (FIG. 2A) and/or the DL channels (FIG. 2B)). The UL communications may be performed via the UL carrier 442 using various UL resources (for example, the UL subframes (FIG. 2C) and the UL channels (FIG. 2D)).

The first network 410 operates in a first frequency spectrum and includes the first base station 420 (for example, gNB) communicating at least with the first UE 450, for example, as described in FIGS. 1-3. The first base station 420 (for example, gNB) may communicate with the first UE 450 via a DL carrier 430 and/or an UL carrier 440. The DL communications may be use various DL resources (for example, the DL subframes (FIG. 2A) and/or the DL channels (FIG. 2B)). The UL communications may be performed via the UL carrier 440 using various UL resources (for example, the UL subframes (FIG. 2C) and the UL channels (FIG. 2D)).

In some aspects, the second UE 451 may be on a different network from the first UE 450. In some aspects, the second UE 451 may be on a second network 411 (for example, of the second MNO). The second network 411 may operate in a second frequency spectrum (for example, a second frequency spectrum different from the first frequency spectrum) and may include the second base station 421 (for example, gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (for example, the DL subframes (FIG. 2A) and/or the DL channels (FIG. 2B)). The UL communications are performed via the UL carrier 441 using various UL resources (for example, the UL subframes (FIG. 2C) and/or the UL channels (FIG. 2D)).

In conventional systems, the first base station 420 and/or the second base station 421 assign resources to the UEs for device-to-device (D2D) communications (for example, V2X communications and/or V2V communications). For example, the resources may be a pool of UL resources, both orthogonal (for example, one or more frequency division multiplexing (FDM) channels) and non-orthogonal (for example, code division multiplexing (CDM)/resource spread multiple access (RSMA) in each channel). The first base station 420 and/or the second base station 421 may configure the resources via the PDCCH (for example, faster approach) or RRC (for example, slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (for example, V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (for example, multiple) devices, including to the second UE 451 via the first sidelink carrier 470. The second UE 451 may transmit to one or more (for example, multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (for example, multiple) devices, including the second UE 451 via the first sidelink carrier 470. For example, the first UE 450 may transmit a broadcast transmission via the first sidelink carrier 470 to the multiple devices (for example, the second and third UEs 451, 452). The second UE 451 (for example, among other UEs) may receive such broadcast transmission. Additionally or alternatively, the first UE 450 may transmit a multicast transmission via the first sidelink carrier 470 to the multiple devices (for example, the second and third UEs 451, 452). The second UE 451 and/or the third UE 452 (for example, among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (for example, among other UEs) may receive such unicast transmission. Additionally or alternatively, the second UE 451 may perform sidelink communications with one or more (for example, multiple) devices, including the first UE 450 via the second sidelink carrier 480. For example, the second UE 451 may transmit a broadcast transmission via the second sidelink carrier 480 to the multiple devices. The first UE 450 (for example, among other UEs) may receive such broadcast transmission.

In another example, the second UE 451 may transmit a multicast transmission via the second sidelink carrier 480 to the multiple devices (for example, the first and third UEs 450, 452). The first UE 450 and/or the third UE 452 (for example, among other UEs) may receive such multicast transmission. Further, the second UE 451 may transmit a unicast transmission via the second sidelink carrier 480 to a device, such as the first UE 450. The first UE 450 (for example, among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (for example, one or more portions of a resource block (RB), slot, frequency band, and/or channel associated with a sidelink carrier 470, 480) for such communications and/or without scheduling such communications. Sidelink communications may include traffic communications (for example, data communications, control communications, paging communications and/or system information communications). Further, sidelink communications may include sidelink feedback communications associated with traffic communications (for example, a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (for example, a first UE 450, a second UE 451, and/or a third UE 452). As discussed, a UE may be a vehicle (for example, UE 450, 451), a mobile device (for example, 452), or another type of device. In some cases, a UE may be a special UE, such as a roadside unit (RSU).

Figure 5:
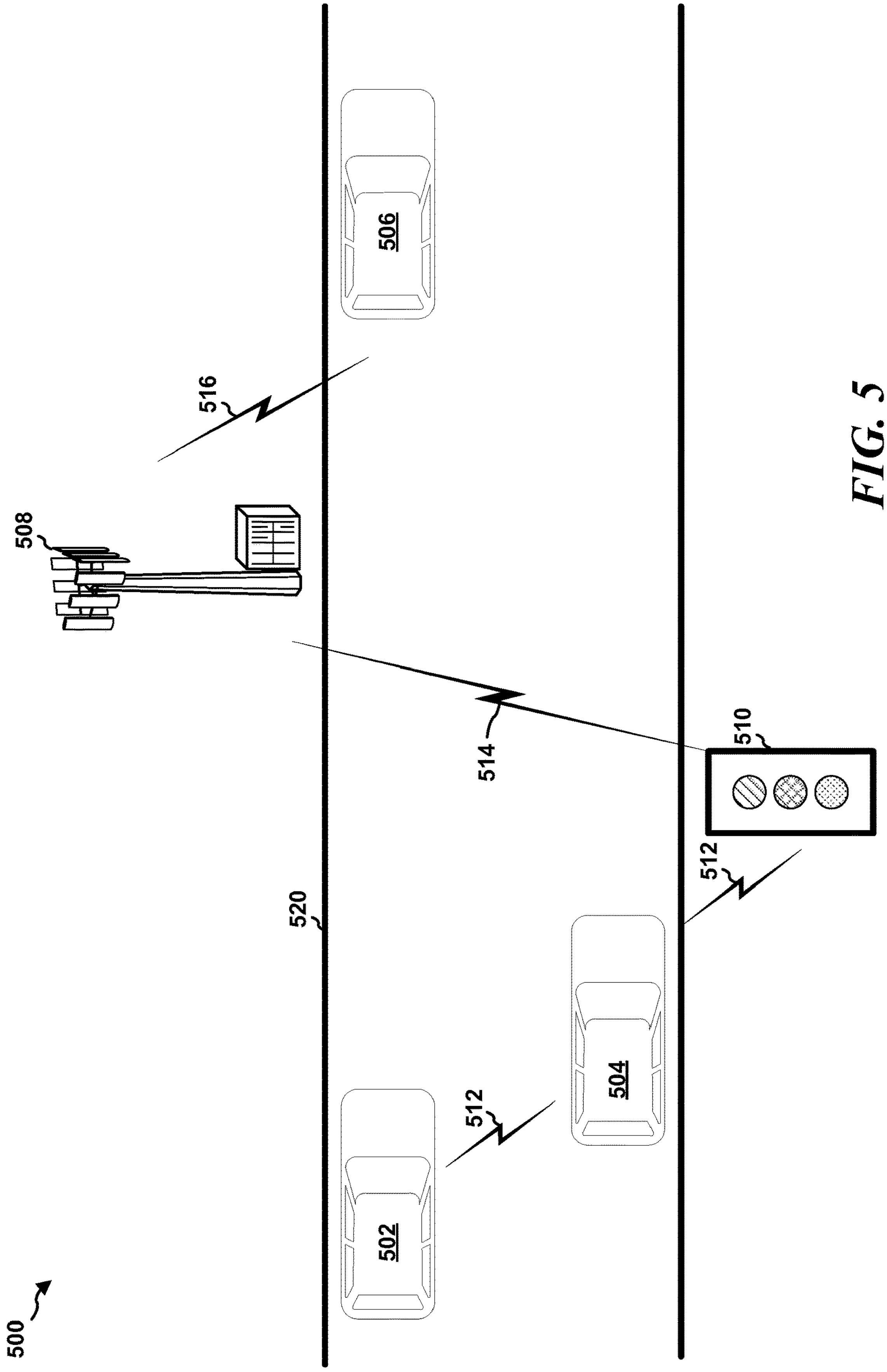
FIG. 5 is a block diagram illustrating an example of a vehicle-to-everything (V2X) system with a roadside unit (RSU), according to aspects of the present disclosure.

FIG. 5 illustrates an example of a vehicle-to-everything (V2X) system with a roadside unit (RSU), according to aspects of the present disclosure. As shown in FIG. 5, V2x system 500 includes a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (for example, gNB) 508 via an UL transmission 514. The gNB 508 may transmit the data received from the RSU 510 to other UEs 506 via a DL transmission 516. The RSU 510 may be incorporated with traffic infrastructure (for example, traffic light, light pole, etc.) For example, as shown in FIG. 5, the RSU 510 is a traffic signal positioned at a side of a road 520. Additionally or alternatively, RSUs 510 may be stand-alone units.

Figure 6:
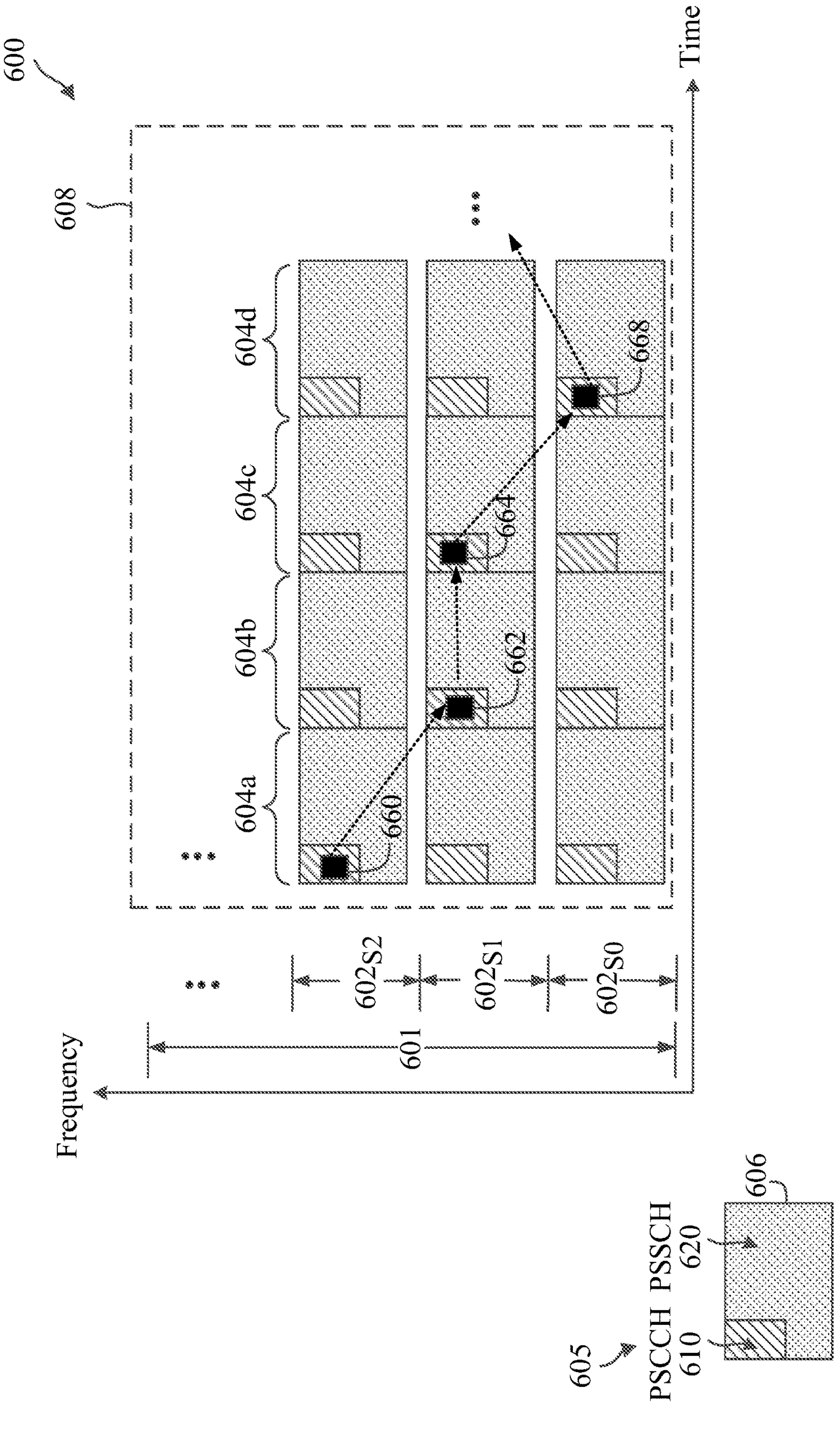
FIG. 6 is a graph illustrating a sidelink (SL) communications scheme, in accordance with various aspects of the present disclosure.

FIG. 6 is a graph illustrating a sidelink (SL) communications scheme, in accordance with various aspects of the present disclosure. A scheme 600 may be employed by UEs such as the UEs 104 in a network such as the network 100. In FIG. 6, the x-axis represents time and the y-axis represents frequency. The CV2X channels may be for 3GPP Release 16 and beyond.

In the scheme 600, a shared radio frequency band 601 is partitioned into multiple subchannels or frequency subbands 602 (shown as $\mathbf{602}_{S0}$, $\mathbf{602}_{S1}$, 602S2) in frequency and multiple sidelink frames 604 (shown as 604*a*, 604*b*, 604*c*, 604*d*) in time for sidelink communications. The frequency band 601 may be at any suitable frequencies. The frequency band 601 may have any suitable bandwidth (BW) and may be partitioned into any suitable number of frequency subbands 602. The number of frequency subbands 602 can be dependent on the sidelink communications BW requirement.

Each sidelink frame 604 includes a sidelink resource 606 in each frequency subband 602. A legend 605 indicates the types of sidelink channels within a sidelink resource 606. In some instances, a frequency gap or guard band may be specified between adjacent frequency subbands 602, for example, to mitigate adjacent band interference. The sidelink resource 606 may have a substantially similar structure as an NR sidelink resource. For instance, the sidelink resource 606 may include a number of subcarriers or RBs in frequency and a number of symbols in time. In some instances, the sidelink resource 606 may have a duration between about one millisecond (ms) to about 20 ms. Each sidelink resource 606 may include a PSCCH 610 and a PSSCH 620. The PSCCH 610 and the PSSCH 620 can be multiplexed in time and/or frequency. The PSCCH 610 may be for part one of a control channel (CCH), with the second part arriving as a part of the shared channel allocation. In the example of FIG. 6, for each sidelink resource 606, the PSCCH 610 is located during the beginning symbol(s) of the sidelink resource 606 and occupies a portion of a corresponding frequency subband 602, and the PSSCH 620 occupies the remaining time-frequency resources in the sidelink resource 606. In some instances, a sidelink resource 606 may also include a physical sidelink feedback channel (PSFCH), for example, located during the ending symbol(s) of the sidelink resource 606. In general, a PSCCH 610, a PSSCH 620, and/or a PSFCH may be multiplexed within a sidelink resource 606.

The PSCCH 610 may carry SCI 660 and/or sidelink data. The sidelink data can be of various forms and types depending on the sidelink application. For instance, when the sidelink application is a V2X application, the sidelink data may carry V2X data (for example, vehicle location information, traveling speed and/or direction, vehicle sensing measurements, etc.). Alternatively, when the sidelink application is an IIoT application, the sidelink data may carry IIoT data (for example, sensor measurements, device measurements, temperature readings, etc.). The PSFCH can be used for carrying feedback information, for example, HARQ ACK/NACK for sidelink data received in an earlier sidelink resource 606.

In an NR sidelink frame structure, the sidelink frames 604 in a resource pool 608 may be contiguous in time. A sidelink UE (for example, the UEs 104) may include, in SCI 660, a reservation for a sidelink resource 606 in a later sidelink frame 604. Thus, another sidelink UE (for example, a UE in the same NR-U sidelink system) may perform SCI sensing in the resource pool 608 to determine whether a sidelink resource 606 is available or occupied. For instance, if the sidelink UE detected SCI indicating a reservation for a sidelink resource 606, the sidelink UE may refrain from transmitting in the reserved sidelink resource 606. If the sidelink UE determines that there is no reservation detected for a sidelink resource 606, the sidelink UE may transmit in the sidelink resource 606. As such, SCI sensing can assist a UE in identifying a target frequency subband 602 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 602 in one sidelink frame 604 to another frequency subband 602 in another sidelink frame 604. In the illustrated example of FIG. 6, during the sidelink frame 604*a*, the sidelink UE transmits SCI 660 in the sidelink resource 606 located in the frequency subband 602$_{S2}$ to reserve a sidelink resource 606 in a next sidelink frame 604*b* located at the frequency subband 602$_{S1}$. Similarly, during the sidelink frame 604*b*, the sidelink UE transmits SCI 662 in the sidelink resource 606 located in the frequency subband 602*si* to reserve a sidelink resource 606 in a next sidelink frame 604*c* located at the frequency subband 602S1. During the sidelink frame 604*c*, the sidelink UE transmits SCI 664 in the sidelink resource 606 located in the frequency subband 602$_{S1}$ to reserve a sidelink resource 606 in a next sidelink frame 604*d* located at the frequency subband 602$_{S0}$. During the sidelink frame 604*d*, the sidelink UE transmits SCI 668 in the sidelink resource 606 located in the frequency subband 602$_{S0}$. The SCI 668 may reserve a sidelink resource 606 in a later sidelink frame 604.

The SCI can also indicate scheduling information and/or a destination identifier (ID) identifying a target receiving sidelink UE for the next sidelink resource 606. Thus, a sidelink UE may monitor SCI transmitted by other sidelink UEs. Upon detecting SCI in a sidelink resource 606, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 604 in different frequency subband (for example, via frequency division multiplexing (FDM)). For instance, in the sidelink frame 604*b*, one pair of sidelink UEs may communicate sidelink data using a sidelink resource 606 in the frequency subband 602S2 while another pair of sidelink UEs may communicate sidelink data using a sidelink resource 606 in the frequency subband 602S1.

In some aspects, the scheme 600 is used for synchronous sidelink communications. That is, the sidelink UEs may be synchronized in time and are aligned in terms of symbol boundary, sidelink resource boundary (for example, the starting time of sidelink frames 604). The sidelink UEs may perform synchronization in a variety of forms, for example, based on sidelink synchronization signal blocks (SSBs) received from a sidelink UE and/or NR-U SSBs received from a base station (for example, the base station 102 described with reference to FIG. 1) while in-coverage of the base station. In some aspects, the sidelink UE may be preconfigured with the resource pool 608 in the frequency band 601, for example, while in coverage of a serving base station. The resource pool 608 may include a plurality of sidelink resources 606. The base station can configure the sidelink UE with a resource pool configuration indicating resources in the frequency band 601 and/or the subbands 602 and/or timing information associated with the sidelink frames 604. In some aspects, the scheme 600 includes mode-2 RRA (for example, supporting autonomous radio resource allocation (RRA) that can be used for out-of-coverage sidelink UEs or partial-coverage sidelink UEs).

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 7:
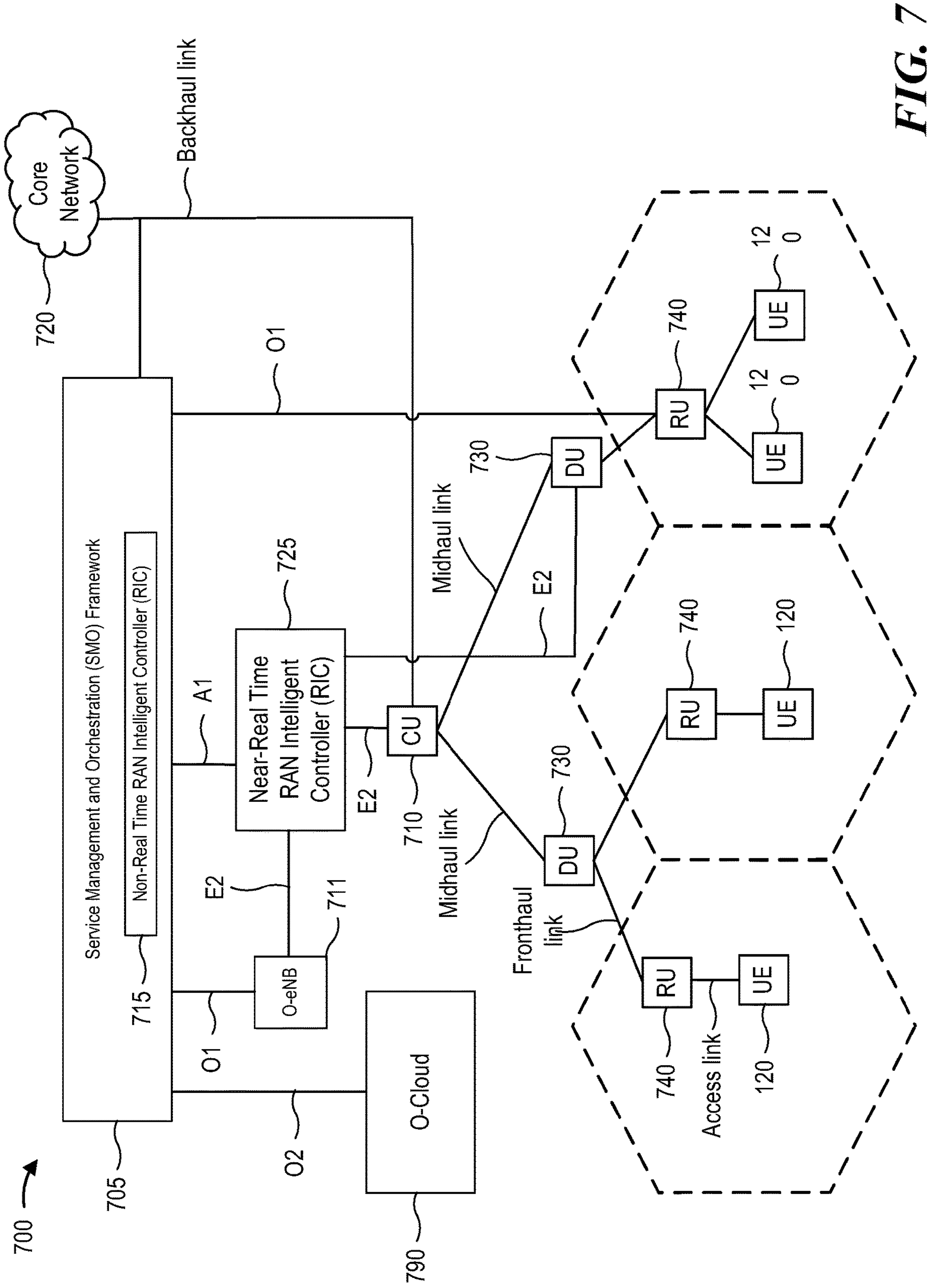
FIG. 7 is a block diagram illustrating an example disaggregated base station architecture.

FIG. 7 shows a diagram illustrating an example disaggregated base station 700 architecture. The disaggregated base station 700 architecture may include one or more central units (CUs) 710 that can communicate directly with a core network 720 via a backhaul link, or indirectly with the core network 720 through one or more disaggregated base station units (such as a Near-Real Time (Near-RT) RAN Intelligent Controller (RIC) 725 via an E2 link, or a Non-Real Time (Non-RT) RIC 715 associated with a Service Management and Orchestration (SMO) Framework 705, or both). A CU 710 may communicate with one or more distributed units (DUs) 730 via respective midhaul links, such as an F1 interface. The DUs 730 may communicate with one or more radio units (RUs) 740 via respective fronthaul links. The RUs 740 may communicate with respective UEs 104 via one or more radio frequency (RF) access links. In some implementations, the UE 104 may be simultaneously served by multiple RUs 740.

Each of the units, i.e., the CUs 710, the DUs 730, the RUs 740, as well as the Near-RT RICs 725, the Non-RT RICs 715 and the SMO Framework 705, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 710 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 710. The CU 710 may be configured to handle user plane functionality (i.e., Central Unit-User Plane (CU-UP)), control plane functionality (i.e., Central Unit-Control Plane (CU-CP)), or a combination thereof. In some implementations, the CU 710 can be logically split into one or more CU-UP units and one or more CU-CP units. The CU-UP unit can communicate bidirectionally with the CU-CP unit via an interface, such as the E1 interface when implemented in an O-RAN configuration. The CU 710 can be implemented to communicate with the DU 730, as necessary, for network control and signaling.

The DU 730 may correspond to a logical unit that includes one or more base station functions to control the operation of one or more RUs 740. In some aspects, the DU 730 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 730 may further host one or more low PHY layers. Each layer (or module) can be implemented with an interface configured to communicate signals with other layers (and modules) hosted by the DU 730, or with the control functions hosted by the CU 710.

Lower-layer functionality can be implemented by one or more RUs 740. In some deployments, an RU 740, controlled by a DU 730, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 740 can be implemented to handle over the air (OTA) communication with one or more UEs 104. In some implementations, real-time and non-real-time aspects of control and user plane communication with the RU(s) 740 can be controlled by the corresponding DU 730. In some scenarios, this configuration can enable the DU(s) 730 and the CU 710 to be implemented in a cloud-based RAN architecture, such as a vRAN architecture.

The SMO Framework 705 may be configured to support RAN deployment and provisioning of non-virtualized and virtualized network elements. For non-virtualized network elements, the SMO Framework 705 may be configured to support the deployment of dedicated physical resources for RAN coverage requirements, which may be managed via an operations and maintenance interface (such as an O1 interface). For virtualized network elements, the SMO Framework 705 may be configured to interact with a cloud computing platform (such as an open cloud (O-Cloud) X90) to perform network element life cycle management (such as to instantiate virtualized network elements) via a cloud computing platform interface (such as an O2 interface). Such virtualized network elements can include, but are not limited to, CUs 710, DUs 730, RUs 740, and Near-RT RICs 725. In some implementations, the SMO Framework 705 can communicate with a hardware aspect of a 4G RAN, such as an open eNB (O-eNB) 711, via an O1 interface. Additionally, in some implementations, the SMO Framework 705 can communicate directly with one or more RUs 740 via an O1 interface. The SMO Framework 705 also may include a Non-RT RIC 715 configured to support functionality of the SMO Framework 705.

The Non-RT RIC 715 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 725. The Non-RT RIC 715 may be coupled to or communicate with (such as via an A1 interface) the Near-RT RIC 725. The Near-RT RIC 725 may be configured to include a logical function that enables near-real-time control and optimization of RAN elements and resources via data collection and actions over an interface (such as via an E2 interface) connecting one or more CUs 710, one or more DUs 730, or both, as well as an O-eNB, with the Near-RT RIC 725.

In some implementations, to generate AI/ML models to be deployed in the Near-RT RIC 725, the Non-RT RIC 715 may receive parameters or external enrichment information from external servers. Such information may be utilized by the Near-RT RIC 725 and may be received at the SMO Framework 705 or the Non-RT RIC 715 from non-network data sources or from network functions. In some examples, the Non-RT RIC 715 or the Near-RT RIC 725 may be configured to tune RAN behavior or performance. For example, the Non-RT RIC 715 may monitor long-term trends and patterns for performance and employ AI/ML models to perform corrective actions through the SMO Framework 705 (such as reconfiguration via O1) or via creation of RAN management policies (such as A1 policies).

As discussed, resources from the one or more resource pools may be allocated based on one of two resource allocation modes. A base station scheduled mode, which may be referred to as Mode 1, is one of the two resource allocation modes. The other of the two modes, which is referred to as Mode 2, is a UE autonomous selection mode. In Mode 1, the UE may send a service request to the serving base station. The base station may then approve the service request and assign time-frequency resources for the sidelink communication. In Mode 2, the base station transmits a resource pool to one or more UEs. The resource pool may be a list of time-frequency resources that are available for use for sidelink communications. The base station may transmit the resource pool to a UE (for example, using a random access channel (RACH) or dedicated signaling). In Mode 2, after receiving the resource pool from the base station, the UE may select a time-frequency resource from the resource pool to use for the sidelink communications. The UE may select the time-frequency resources based on a channel sensing function. The channel sensing function may determine a reference signal received power (RSRP) for a resource and a priority of a transmission on a resource. For an in-coverage UE, a base station may be configured to use Mode 1 or Mode 2. In contrast, an out-of-coverage UE may only use Mode 2.

In Mode 1, the base station may allocate communication resources, such as sidelink resources, for one transport block (TB) to a sidelink transmitter (for example, a sidelink UE) via downlink control information (DCI), such as DCI format 3_0. The communication resources may be allocated for an initial transmission or a retransmission. In addition to allocating sidelink resources, the DCI may also allocate feedback resources. Still, the DCI may not specify a destination identity (ID) for a sidelink transmission that uses the allocated sidelink resources. Additionally, in Mode 1, the base station may indicate a minimum and maximum modulation and coding scheme (MCS) range for the sidelink transmitter via RRC signaling. For ease of explanation, various aspects of the present disclosure will use a sidelink UE as an example of the sidelink transmitter. Still, the sidelink transmitter is not limited to the sidelink UE, other types of sidelink devices may be used as the sidelink transmitter.

Although the base station controls the use of sidelink resources in Mode 1, the sidelink UE may control various properties of the sidelink transmission. In some examples, the sidelink UE may select the MCS within the range specified by the base station. Additionally, the sidelink UE may select a TB and a destination (for example, receiver ID) for the sidelink transmission that uses the allocated resources. The sidelink UE may be limited to using the allocated resources to one TB and may not use the allocated resources in multiple TBs. Furthermore, the sidelink UE may enable or disable sidelink HARQ. Still, the sidelink UE may be limited to using the new data indicator (NDI) included in the DCI. Other properties controlled by the sidelink UE may include, for example, a DM-RS pattern, a type of precoding, transmission layers, a CSI-RS, a redundancy version identifier (RV-ID), and a cast type.

Based on a level of control afforded to the base station under Mode 1, the base station may fail to manage interference caused by sidelink transmissions from the sidelink UE. In some examples, the base station may fail to allocate proper resources to manage interference because the base station is unaware of the destination of the sidelink transmission. The base station may mitigate interference by adjusting a gain of transmissions by the base station or the sidelink UE if the base station is aware of a beam direction associated with the sidelink transmission from the sidelink UE. Additionally, or alternatively, the base station may fail to allocate proper resources to manage interference because the base station cannot control the MCS selected by the sidelink UE. The base station may increase spatial re-use to mitigate interference if the base station is aware of the transmission power associated with the sidelink transmissions from the sidelink UE.

Figure 8A:
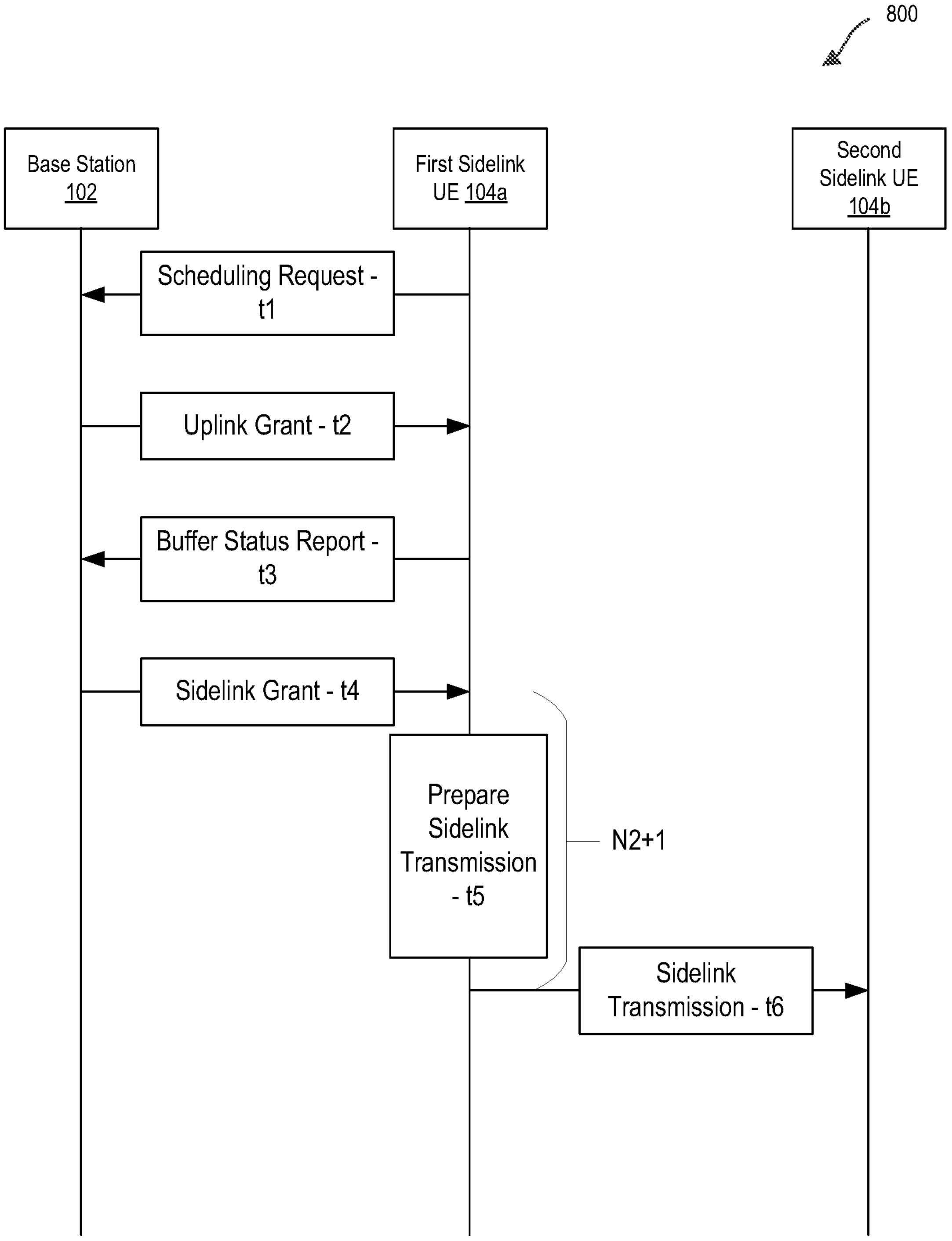
FIG. 8A is a timing diagram illustrating an example of Mode 1 resource allocation, in accordance with various aspects of the present disclosure.

FIG. 8A is a timing diagram illustrating an example 800 of Mode 1 resource allocation, in accordance with various aspects of the present disclosure. In the example 800, prior to time t1, a buffer of a first sidelink UE 104*a* may store a sidelink packet that is intended for transmission to a second sidelink UE 104*b*. As shown in FIG. 7, at time t1, the first sidelink UE 104*a* may transmit a scheduling request to the base station 102. In the current disclosure, the base station 102 may be a network node, an aggregated base station, or a disaggregated base station, such as the disaggregated base station 700 described with reference to FIG. 7. The scheduling request may be transmitted on a configured scheduling request occasion, such as a PUCCH. Additionally, the scheduling request may be transmitted based on the buffer receiving the sidelink packet.

At time t2, the base station 102 schedules a UL grant based on the scheduling request of time t1. The UL grant may provide UL resources for a data transmission from the first sidelink UE 104*a*, such as a data transmission on a PUSCH. At time t3, the first sidelink UE 104*a* may transmit a buffer status report (BSR) indicating a buffer status for a sidelink transmission. The BSR may indicate that the buffer includes the sidelink packet and a size of the sidelink packet, such that the base station 102 may allocate appropriate resources for transmitting the sidelink packet. Additionally, the UE 104*a* may transmit the BSR via the UL resources allocated in the UL grant received at time t2. At time t4, the base station 102 transmits a sidelink grant allocating sidelink resources for transmitting the data in the buffer. The base station 102 may allocate the sidelink resources based on receiving the BSR at time t3. The sidelink grant may be transmitted via DCI.

As shown in FIG. 8A, at time t5, the first sidelink UE 104*a* prepares the sidelink transmission based on receiving the sidelink grant. In some examples, at time t5, the first sidelink UE 104*a* may encode the sidelink packet and prepare a waveform for transmission to the second sidelink UE 104*b*. Finally, at time t6, the first sidelink UE 104*a* transmits the sidelink packet to the second sidelink UE 104*b* via the allocated sidelink resources. The sidelink packet may be transmitted via a PSSCH. An amount of time between receiving the sidelink grant (time t4) and transmitting the sidelink packet (time t6) may be standardized, such that the first sidelink UE 104*a* may have sufficient time to decode the sidelink grant and to prepare the sidelink transmission. In some implementations, the amount of time between receiving the sidelink grant (time t4) and transmitting the sidelink packet (time t6) may be greater than N2+1, where N is a number of subframes in a frame.

Although not shown in the example 800 of FIG. 8A, the first sidelink UE 104*a* may receive feedback from the second sidelink UE 104*b* indicating whether the sidelink transmission was successful. The first sidelink UE 104*a* may initiate a re-transmission to the second sidelink UE 104*b*, if necessary. In such examples, the first sidelink UE 104*a* may feedback a negative acknowledgment (NACK) to the base station 102 requesting re-transmission resources if the re-transmission is necessary. Alternatively, the first sidelink UE 104*a* may feedback an acknowledgment (ACK) to the base station 102 indicating a successful transmission.

In the example 800 of FIG. 8A, an amount of time between transmitting the scheduling request (time t1) and transmitting the sidelink packet (time t6) may be greater than a PDB associated with the sidelink packet. Additionally, an amount of latency associated with scheduling and transmitting the sidelink packet may be undesirable given the nature of sidelink transmissions. In some examples, sidelink transmissions may be specified for urgent messages, such as a warning to a pedestrian or a warning from an emergency vehicle. Therefore, it may be desirable to reduce the amount of latency associated with scheduling and transmitting the sidelink packet.

Figure 8B:
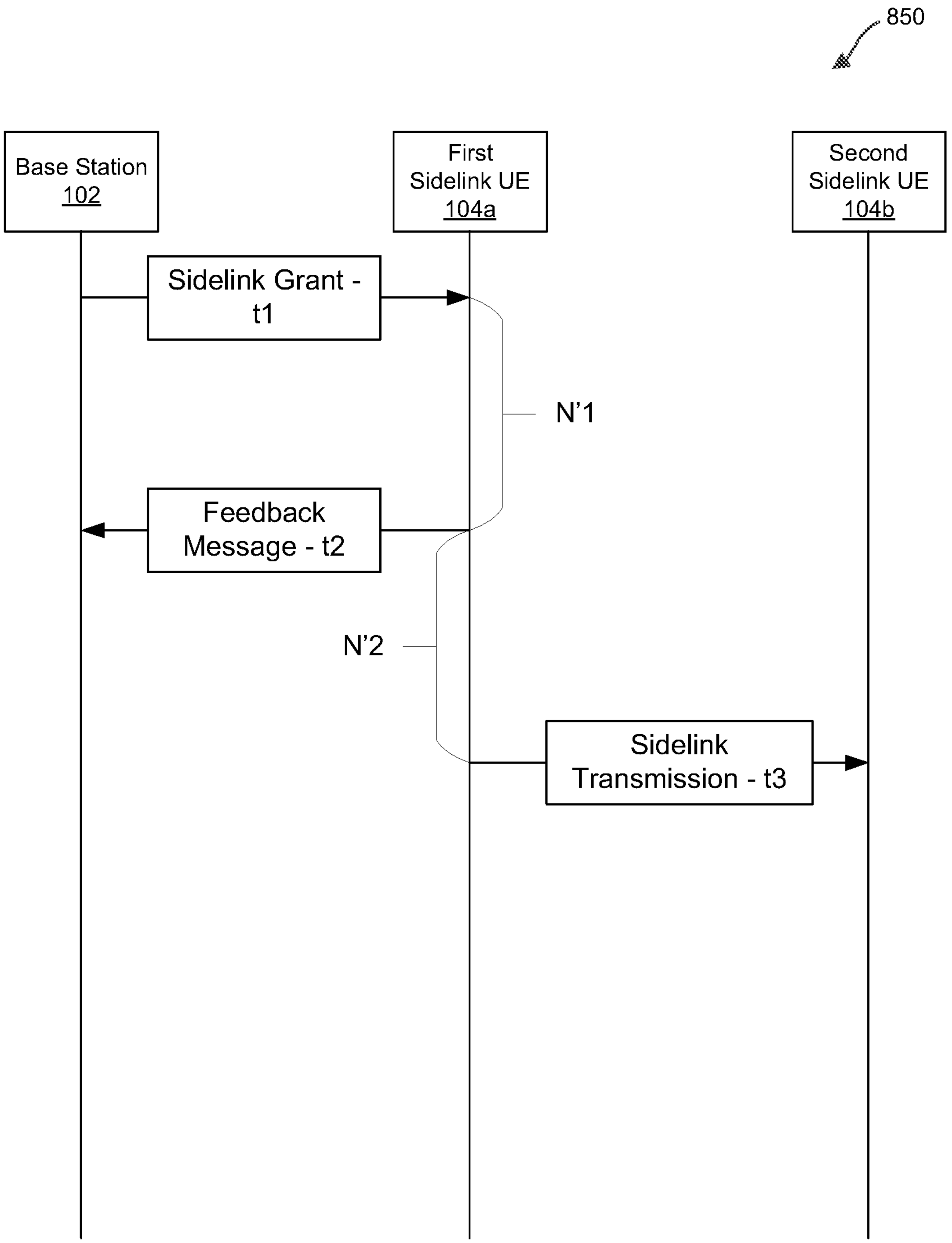
FIG. 8B is a timing diagram illustrating an example of allocating sidelink resources via a proactive sidelink grant, in accordance with various aspects of the present disclosure.

Various aspects of the present disclosure are directed to reducing the amount of latency associated with scheduling and transmitting the sidelink packet. In some implementations, a proactive sidelink grant may be used to reduce the amount of latency associated with scheduling and transmitting the sidelink packet. In contrast to a conventional sidelink grant that is transmitted in response to a scheduling request and a BSR, transmission of the proactive sidelink grant, by the base station, is not associated with a triggering event. FIG. 8B is a timing diagram illustrating an example 850 of allocating sidelink resources via a proactive sidelink grant, in accordance with various aspects of the present disclosure. As shown in the example 850 of FIG. 8B, at time t1, a first sidelink UE 104*a* receives the sidelink grant (for example, proactive sidelink grant) from the base station 102. In the example 850, transmission of the sidelink grant transmitted, at time t1, is not based on the first sidelink UE 104*a* transmitting a scheduling request or a BSR. In some examples, the base station 102 may transmit the sidelink grant, at time t1, based on a change in availability of previously allocated resources.

In the example 850, the sidelink grant may allocate sidelink resources, to the first sidelink UE 104*a*, for a sidelink transmission to a sidelink receiver, such as a second sidelink UE 104*b*. In some examples, the sidelink grant may also allocate uplink resources (for example, PUCCH resources) for transmission of a feedback message from the first sidelink UE 104*a*. As shown in FIG. 8B, at time t2, the first sidelink UE 104*a* may transmit a feedback message to the base station 102. The first sidelink UE 104*a* may transmit the feedback message based on whether one or both of a first sidelink packet condition or a second sidelink packet condition are satisfied. The first sidelink packet condition may be satisfied based on a buffer (for example, sidelink packet transmission buffer) storing a sidelink packet. The second sidelink packet condition may be satisfied based on the sidelink resources being capable of transmitting the sidelink packet based on a size of the sidelink packet. The sidelink resources may be capable of transmitting the sidelink packet based on the size of the sidelink packet being equal to or less than a size of the allocated sidelink resources. In some examples, the feedback message is transmitted based on one or both of the first sidelink packet condition or the second sidelink packet condition not being satisfied. In such examples, the first sidelink UE 104*a* may transmit the feedback message based on the first sidelink UE 104*a* not intending to use the allocated sidelink resources for a sidelink transmission. Additionally, in such examples, the base station 102 may determine that the first sidelink UE 104*a* intends to use the allocated sidelink resources based on an absence of a feedback message. Furthermore, in such examples, the feedback message indicates the sidelink packet transmission buffer is empty, or the sidelink resources are incapable of transmitting the sidelink packet based on the size of the sidelink packet being greater than the size of the allocated sidelink resources. In some other examples, the first sidelink UE 104*a* transmits the feedback message based on both the first sidelink packet condition and the second sidelink packet condition being satisfied. In such examples, the first sidelink UE 104*a* may transmit the feedback message based on the first sidelink UE 104*a* intending to use the allocated sidelink resources for the sidelink transmission.

Furthermore, as shown in FIG. 8B, at time t3, the first sidelink UE 104*a* transmits the sidelink packet to the second sidelink UE 104*b* via the allocated sidelink resources. The first sidelink UE 104*a* may transmit the sidelink packet via a PSSCH. An amount of time (for example, a number of symbols) between receiving the sidelink grant (time t1) and a scheduled time for transmitting the feedback message (time t2) may be standardized. In some examples, a first number of symbols (N'1) may be allocated between a last symbol associated with the sidelink grant (time t1) and a first symbol associated with the uplink grant for the feedback message (time t2). Additionally, an amount of time (for example, a number of symbols) between transmitting the feedback message (time t2) and transmitting the sidelink packet (time t3) may be standardized. In some examples, a second number of symbols (N'2) may be allocated between a last symbol associated with the uplink grant (time t2) and a first symbol associated with the sidelink transmission (time t3). A sum of the first number of symbols (N'1) and the second number of symbols (N'2) may be equal to or greater than a preparation time for transmitting the sidelink packet (N2+1), such as the preparation time described with reference to FIG. 8A.

Although not shown in the example 850 of FIG. 8B, the first sidelink UE 104*a* may receive feedback from the second sidelink UE 104*b* indicating whether the sidelink transmission was successful. The first sidelink UE 104*a* may initiate a re-transmission to the second sidelink UE 104*b*, if necessary. In such examples, the first sidelink UE 104*a* may feedback a NACK to the base station 102 requesting re-transmission resources if the re-transmission is necessary. Alternatively, the first sidelink UE 104*a* may feedback an ACK to the base station 102 indicating a successful transmission.

As discussed, the feedback message may indicate that the first sidelink UE 104*a* does not intend to use the allocated sidelink resources. In some examples, based on determining that the first sidelink UE 104*a* does not intend to use the allocated sidelink resources, the base station 102 may transmit another sidelink grant to another sidelink UE to allocate the sidelink resources that were not used by the first sidelink UE 104*a*.

Additionally, or alternatively, some aspects are directed to managing interference caused by sidelink transmissions from a sidelink transmitter to a sidelink receiver. In such aspects, the base station may transmit a conditional sidelink grant that indicates one or more resource conditions for using the grant. By providing conditions for the use of the conditional sidelink grant, the base station may improve resource use. In some examples, the sidelink resources allocated by the conditional sidelink grant may be used concurrently by one or more other network devices, such as a UE, a sidelink UE, or a base station. In some such examples, the sidelink resources granted via the conditional sidelink grant may be the same sidelink resources granted to another UE, such as another sidelink UE. In other such examples, the sidelink resources granted via the conditional sidelink grant may be downlink resources, uplink resources, or sidelink resources. Additionally, the sidelink resources granted via the conditional sidelink may be simultaneously used by another network device for a downlink transmission, uplink transmission, or sidelink transmission. Because another device may concurrently use the same resources granted via the conditional sidelink grant, the base station may impose conditions on the use of the granted resources to mitigate interference, such as interference experienced at the base station or another UE based on sidelink transmissions from a sidelink transmitter that received the conditional sidelink grant.

The conditional sidelink grant may be exclusive of the proactive sidelink grant described with reference to FIG. 8B. For ease of explanation, the conditional sidelink grant may be referred to as a conditional grant and the proactive sidelink grant may be referred to as a proactive grant. In some examples, a base station may transmit the conditional grant based on receiving a BSR, such as a conditional BSR, from a sidelink UE. As an example, the sidelink grant described with reference to FIG. 8A may be a conditional grant. In this example, the BSR described in the example 800 may be a conditional BSR. In some examples, when the conditional grant is transmitted to a single sidelink UE, the conditional grant may be limited to allocating sidelink resources and may not allocate uplink resources for transmission of a feedback message. In some other examples, the proactive grant described with reference to FIG. 8B may also be a conditional grant. In such examples, the sidelink grant may be both proactive and conditional. In still some other examples, a sidelink grant may be proactive without further restrictions, such as the sidelink grant described with reference to FIG. 8B. When a sidelink grant is only proactive, additional restrictions (for example, conditions) may not be imposed by the base station when the sidelink UE indicates its intent to use the sidelink grant. In some examples, the base station may indicate if a sidelink grant is one or both of a proactive grant or a conditional grant. The indication may be transmitted via an RRC configuration of the DCI or a bit field in the DCI.

In some examples, a base station may send a sidelink grant to a group of sidelink UEs. In such examples, the sidelink grant may be one or both of a conditional grant or a proactive grant. The group of sidelink UEs may simultaneously receive the sidelink grant. In some examples, the sidelink grant may also indicate uplink resources for transmitting a feedback message to the base station. When the sidelink grant is transmitted to the group of UEs, the feedback resources may be allocated for a proactive grant, a conditional grant, or a conditional and proactive grant. As previously discussed, the feedback message may indicate that a sidelink UE intends to use or not use the sidelink grant. In some examples, each UE in the group of sidelink UEs may be configured to use a different orthogonal sequence for the feedback message, such that the feedback messages do not collide. Additionally, if two or more sidelink UEs of the group of sidelink UEs indicate an intent to use the sidelink grant, the base station may transmit another message indicating one or more particular sidelink UEs from the two or more sidelink UEs that may use the sidelink grant.

In some examples, a sidelink UE may report different types of BSRs. In some such examples, the sidelink UE may transmit a conventional BSR to receive a conventional sidelink grant. In some other examples, the sidelink UE may transmit a conditional BSR to receive a conditional grant. A sidelink packet that may tolerate a higher latency, such as a sidelink packet associated with a non-emergency sidelink transmission, may be reported via the conditional BSR. The conventional BSR may be associated with sidelink packets having a latency tolerance that is less than the latency tolerance of sidelink packets associated with the conditional BSR. As an example, the conventional BSR may be associated with sidelink packets associated with an emergency sidelink transmission. In some examples, conditional BSRs and conventional BSRs may be associated with different MAC-control elements (MAC-CEs), where the MAC-CE associated with conditional BSRs is associated with a first extended logical channel ID (eLCID) and the MAC-CE associated with conventional BSRs is associated with a second eLCID. In other examples, both the conditional BSRs and conventional BSRs may be associated with a same MAC-CE, and reserved bit fields in the MAC-CE may indicate a type of BSR.

Figure 9:
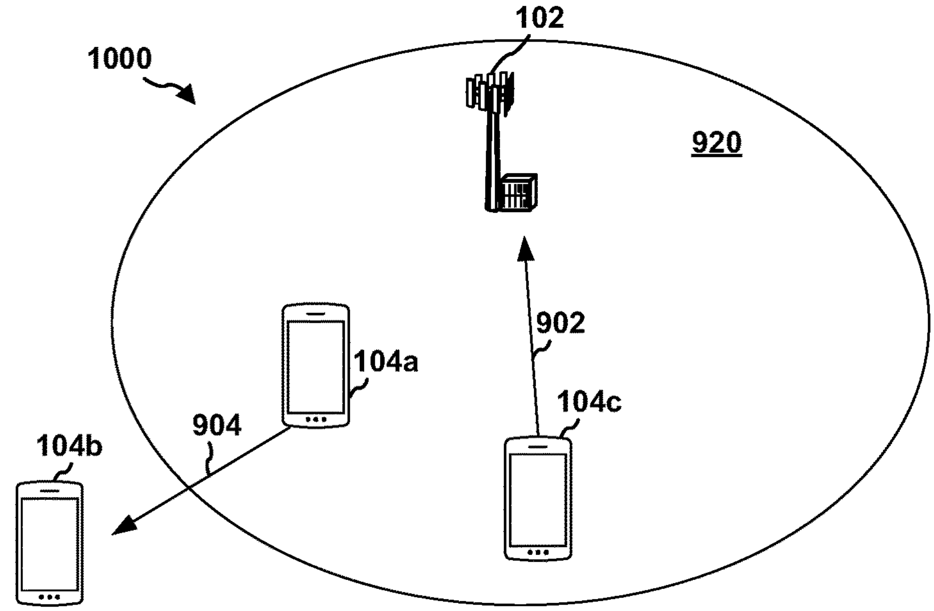

FIG. 9 is a block diagram illustrating an example of a wireless communication system 900, in accordance with various aspects of the present disclosure. In the example of FIG. 9, a UE 104*c* and a first sidelink UE 104*a* are within a cell 920 served by a base station 102. The base station 102 may transmit an uplink grant to a UE 104*c* scheduling an uplink transmission 902, such as a PUSCH transmission, from the UE 104*c* to the base station 102. The uplink grant may specify precoding for the uplink transmission 902 to minimize interference toward transmissions between a first sidelink UE 104*a* and a second sidelink UE 104*b*. The precoding may be specified if the base station 102 receives channel state information associated with a channel between the UE 104*c* and the base station 102.

Additionally, in the example of FIG. 9, the base station transmits a sidelink grant to a first sidelink UE 104*a*. In the example of FIG. 9, the sidelink grant may be a conditional grant or a conditional and proactive grant. In some examples, the sidelink grant may allocate uplink resources for a sidelink transmission 904 from the first sidelink UE 104*a* to the second sidelink UE 104*b*. In conventional systems, the uplink resources are limited to uplink transmissions from the first sidelink UE 104*a* to the base station 102. In some examples, the uplink resources may be any uplink resource available to the first sidelink UE 104*a*. In the example of FIG. 9, the base station 102 may impose a condition on the use of the sidelink resources, such that the sidelink transmission 904 may co-exist with the uplink transmission 902. In some examples, the first sidelink UE 104*a* may only use the allocated uplink resources if transmission leakage (for example, interference) toward the base station 102 satisfies an interference condition, such that the base station 102 experiences reduced interference while receiving the uplink transmission 902. In some such examples, the interference satisfies the interference condition based on an amount of interference (for example, leakage) being equal to or less than an interference threshold. In one such example, the interference satisfies the interference condition based on an amount of interference experienced at the base station 102 being less than a decibel (dB) value, such as −30 dB or −60 dB.

In some examples, to satisfy the interference condition, the first sidelink UE 104*a* may beam-form the sidelink transmission 904 to the second sidelink UE 104*b*. In such examples, a sidelobe of the beam-formed sidelink transmission 904 may be less than a threshold. The sidelobe may be directed toward the base station 102. Additionally, the base station 102 may indicate the beam to use for the sidelink transmission. In some other examples, to satisfy the interference condition, the first sidelink UE 104*a* may apply a precoder to the sidelink transmission 904. The precoding may reduce the interference experienced at the base station 102. In some such examples, the precoding may be interference rejection precoding if channel state information for a channel between the first sidelink UE 104*a* and the base station 102 is available to the first sidelink UE 104*a*. In some examples, the base station 102 may indicate a type of precoding in the sidelink grant transmitted to the first sidelink UE 104*a*.

Figure 10:
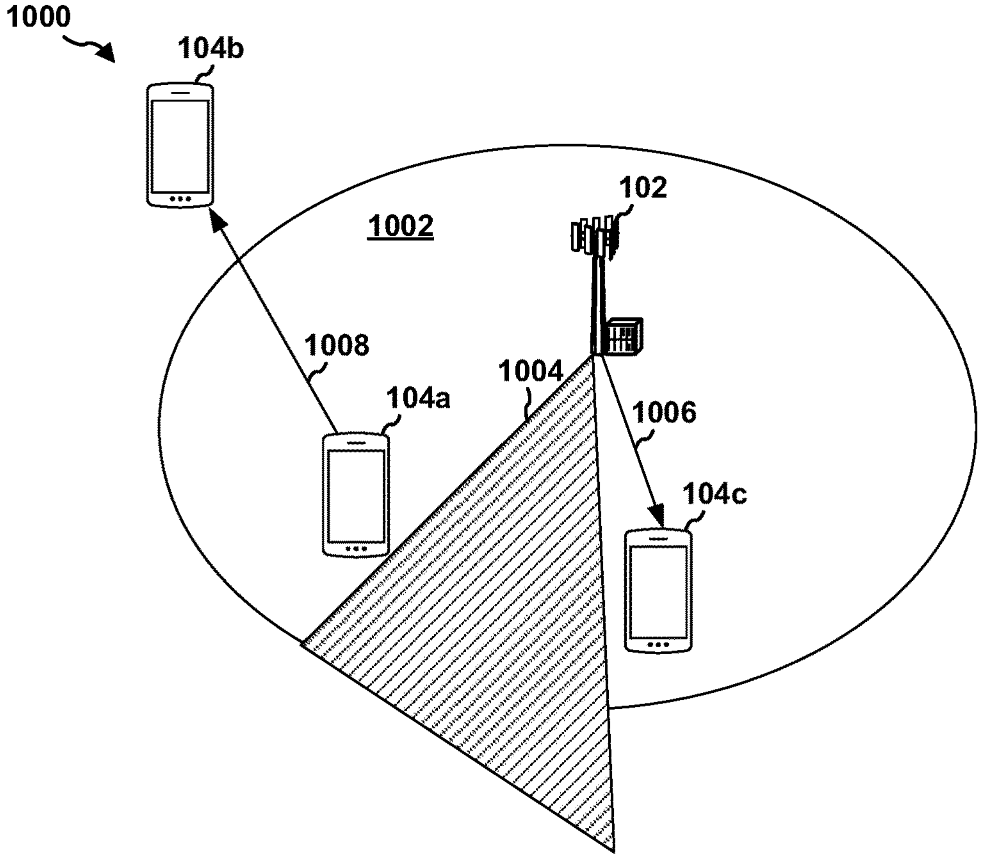

As discussed, in some implementations, a conditional grant may allocate downlink resources for a sidelink transmission. An example of allocating downlink resources for the sidelink transmission may be seen in FIG. 10, which is a block diagram illustrating a wireless communication system 1000, in accordance with various aspects of the present disclosure. In the example of FIG. 10, a UE 104*c* and a first sidelink UE 104*a* are within a cell 1002 served by a base station 102. The base station 102 may transmit data to the UE 104*c* via a transmission 1006 on a downlink channel, such as a PDSCH. Additionally, the base station 102 may transmit a sidelink grant to the first sidelink UE 104*a*. The sidelink grant may allocate downlink resources for a sidelink transmission 1008 from the first sidelink UE 104*a* to a second sidelink UE 104*b*. In the example of FIG. 10, the sidelink grant may be a conditional grant or a conditional and proactive grant.

In some examples, the base station 102 may associate one or more resource conditions for the use of the resources (for example, downlink resources) allocated for the sidelink transmission 1008, such that the sidelink transmission 1008 may coexist with a downlink transmission 1006. In some such examples, the first sidelink UE 104*a* may be allowed to use the allocated resources if the first sidelink UE 104*a* can beam-form the sidelink transmission 1008 toward a direction indicated by the base station 102. The base station 102 may indicate a specific direction for the beam or a prohibited area. In the example of FIG. 10, the base station 102 may prohibit a beam associated with the sidelink transmission 1008 from entering an area 1004 that is adjacent to the UE 104*c*.

Additionally, or alternatively, the base station 102 may indicate a precoder, via the sidelink grant, to apply a precoder to the sidelink transmission 1008 to reduce interference. The precoding may reduce the interference experienced at the UE 104*c*. In some such examples, the precoding condition may be imposed by the base station 102 if channel state information for a channel between the first sidelink UE 104*a* and the second sidelink UE 104*b* is made available to the base station 102. Additionally, or alternatively, in some examples, if channel state information for a channel between the base station 102 and the UE 104*c* is available to the base station 102, the base station 102 may apply interference rejection precoding to the downlink transmissions 106 to the UE 104*c* to reduce interference experienced at the second sidelink UE 104*b*.

Figure 11A:
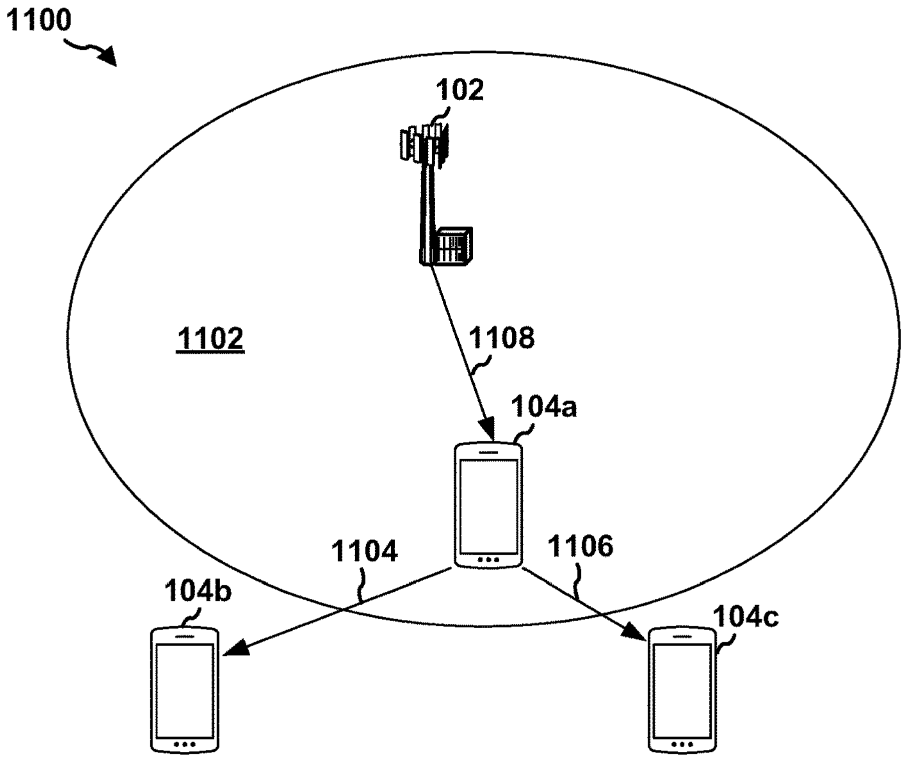

As discussed, in some implementations, sidelink resources allocated by the conditional grant may coexist with other sidelink resources, such that two or more sidelink transmissions may occur simultaneously. An example of allocating coexisting sidelink resources may be seen in FIG. 11A, which is a block diagram illustrating a wireless communication system 1100, in accordance with various aspects of the present disclosure. As shown in the example of FIG. 11A, a first sidelink UE 104*a* is within a cell 1102 served by a base station 102. Additionally, in the example of FIG. 11A, the base station 102 may transmit a first and a second sidelink grant to the first sidelink UE 104*a* via a downlink transmission 1108. The first sidelink grant may be a conditional grant, a proactive grant, or a conditional and proactive grant. The second sidelink grant may be a conditional grant or a proactive and conditional grant. The first sidelink grant may allocate sidelink resources for a first sidelink transmission 1104 to a second sidelink UE 104*b* and the second sidelink grant may allocate the sidelink resources for a second sidelink transmission 1106 to a third sidelink UE 104*c*. The first and second sidelink grants may allocate the same sidelink resources. In some such examples, the second sidelink grant may specify that the first sidelink UE 104*a* may perform the second sidelink transmission 1106 on the sidelink channel using DM-RS ports that have not been used for the first sidelink transmission 1104. The second sidelink grant may also indicate that a precoder should be applied to the second sidelink transmission 1106. The precoder may be a precoder that supports multi-user multiple-input multiple-output (MU-MIMO), such that interference experienced at the second sidelink UE 104*b* is reduced. In some such examples, the first sidelink UE 104*a* may indicate different feedback resources (for example, PSFCH resources) to the second sidelink UE 104*b* and the third sidelink UE 104*c*. The feedback resources may be indicated via SCI signaling.

Figure 11B:
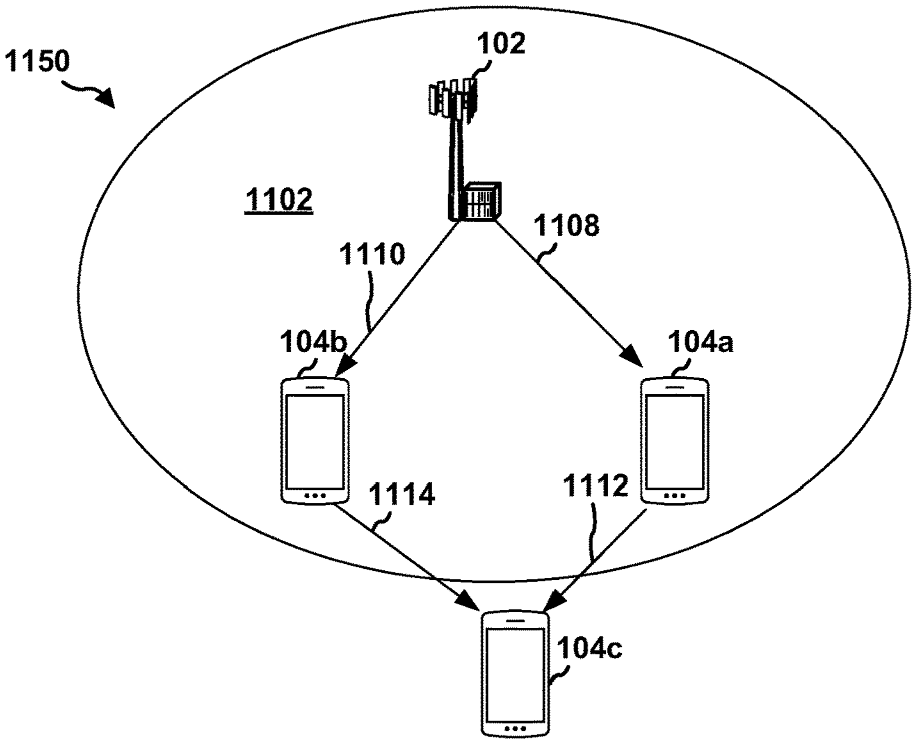

FIG. 11B is a block diagram illustrating a wireless communication system 1150, in accordance with various aspects of the present disclosure. As shown in the example of FIG. 11B, a first sidelink UE 104*a* and a second sidelink UE 104*b* are within a cell 1102 served by a base station 102. Additionally, in the example of FIG. 11B, the base station 102 may transmit a first sidelink grant to the first sidelink UE 104*a* via a first downlink transmission 1108 and a second sidelink grant to a second sidelink UE 104*b* via a second downlink transmission 1110. The first sidelink grant may be a conditional grant, a proactive grant, or a proactive and conditional grant. The second sidelink grant may be a conditional grant or a proactive and conditional grant. In the example of FIG. 11B, the first sidelink grant allocates sidelink resources for a first sidelink transmission 1112 on a sidelink channel from the first sidelink UE 104*a* to a third sidelink UE 104*c*. Additionally, the second sidelink grant allocates sidelink resources for a second sidelink transmission 1114 on a sidelink channel from the second sidelink UE 104*b* to the third sidelink UE 104*c*. The second sidelink grant may indicate a condition that the second sidelink transmission 1114 may only be performed via one or more specified DM-RS ports. Additionally, the second sidelink grant may indicate that the second sidelink transmission 1114 may only be performed if a precoder that supports MU-MIMO is applied to the second sidelink transmission 1114, such that interference experienced at the third sidelink UE 104*c* is reduced.

FIG. 11C is a block diagram illustrating a wireless communication system 1160, in accordance with various aspects of the present disclosure. As shown in the example of FIG. 11C, a first sidelink UE 104*a* and a second sidelink UE 104*b* are within a cell 1102 served by a base station 102. Additionally, in the example of FIG. 11C, the base station 102 may transmit a first sidelink grant to the first sidelink UE 104*a* via a first downlink transmission 1108 and a second sidelink grant to a second sidelink UE 104*b* via a second downlink transmission 1110. The first sidelink grant may be a conditional grant, a proactive grant, or a proactive and conditional grant. The second sidelink grant may be a conditional grant or a proactive and conditional grant. In the example of FIG. 11B, the first sidelink grant allocates sidelink resources for a first sidelink transmission 1118 on a sidelink channel from the first sidelink UE 104*a* to a third sidelink UE 104*c*. Additionally, the second sidelink grant allocates sidelink resources for a second sidelink transmission 1120 on a sidelink channel from the second sidelink UE 104*b* to the fourth sidelink UE 104*d*. The second sidelink grant may indicate a condition that the second sidelink transmission 1120 may only be performed via one or more specified DM-RS ports. Additionally, the second sidelink grant may indicate that the second sidelink transmission 1120 may only be performed if one or more resource conditions are satisfied. The one or more resource conditions may include using a specific beam for the second sidelink transmission 1120 or applying a precoder that supports MU-MIMO, such that interference experienced at the third sidelink UE 104*c* is reduced. In some such examples, channel state information for a sidelink channel between the second sidelink UE 104*b* and the fourth sidelink UE 104*d* may be available to the second sidelink UE 104*b* and the base station 102.

Figure 12C:
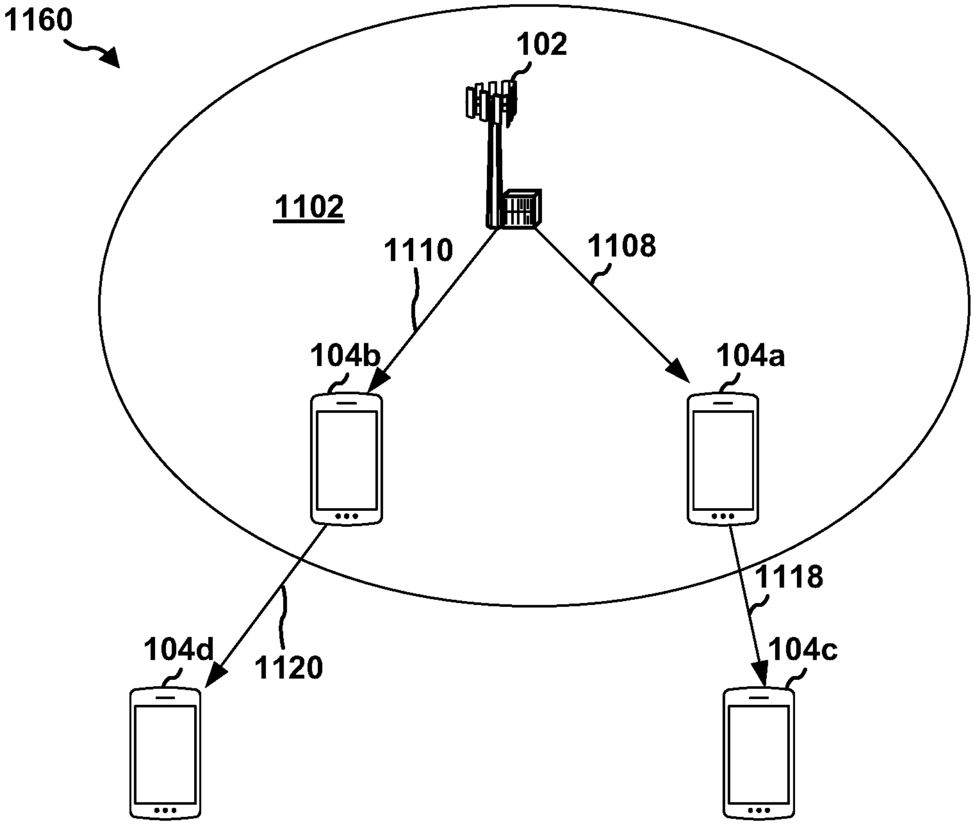
FIG. 12 is a block diagram illustrating an example wireless communication device that supports receiving a sidelink grant, in accordance with aspects of the present disclosure.
Figure 12:
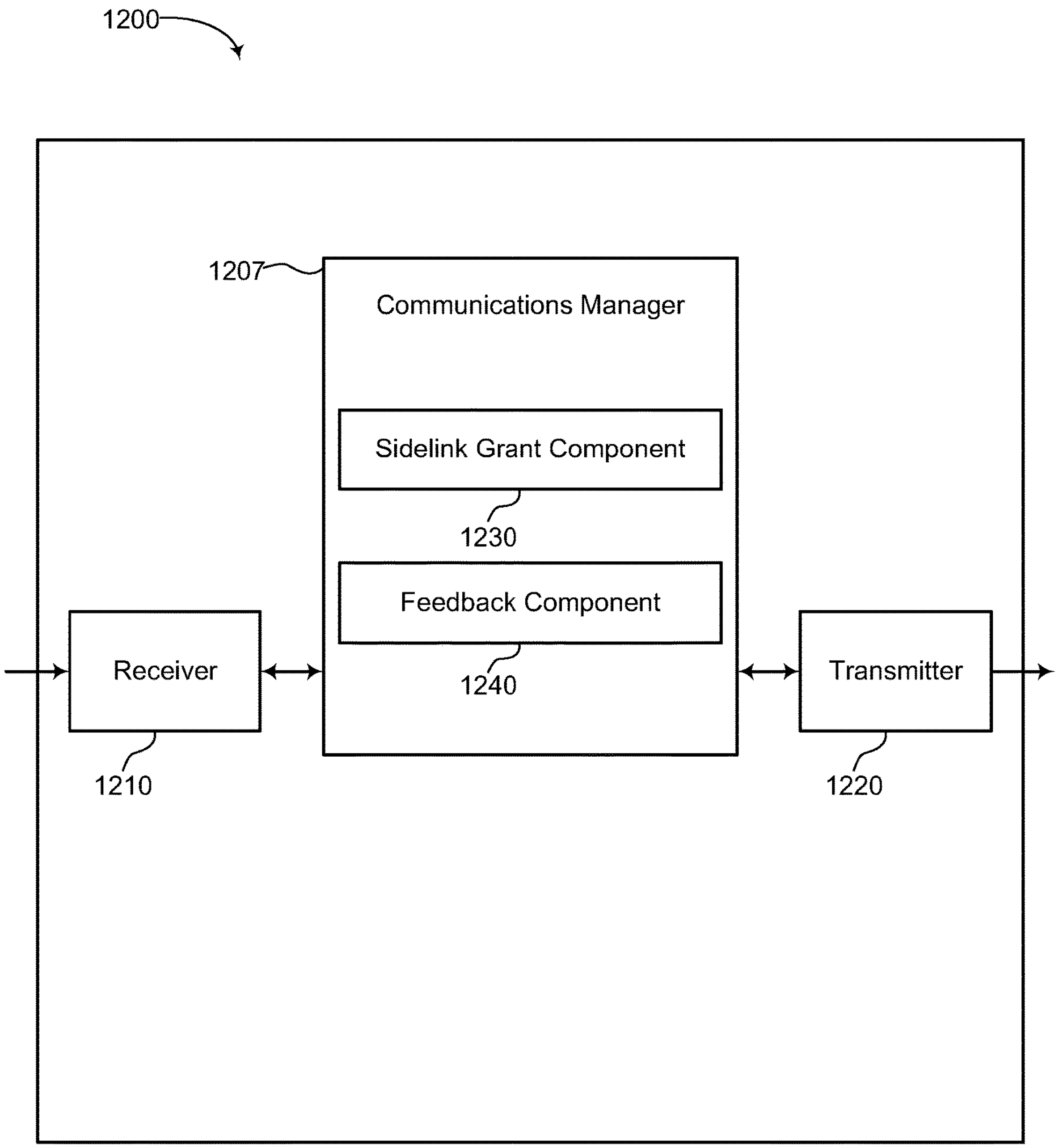

FIG. 12 is a block diagram illustrating an example wireless communication device that supports adopting a pre-configured parameter set based on a current connection mode, in accordance with some aspects of the present disclosure. The device 1200 may be an example of aspects of a UE 104 described with reference to FIGS. 1, 8, 9, 10, 11A, 11B, and 11C. The wireless communications device 1200 may include a receiver 1210, a communications manager 1207, a transmitter 1220, a sidelink grant component 1230, and a feedback component 1240, which may be in communication with one another (for example, via one or more buses). In some examples, the wireless communications device 1200 is configured to perform operations, including operations of the processes 1300 described below with reference to FIG. 13.

In some examples, the wireless communications device 1200 can include a chip, chipset, package, or device that includes at least one processor and at least one modem (for example, a 5G modem or other cellular modem). In some examples, the communications manager 1207, or its subcomponents, may be separate and distinct components. In some examples, at least some components of the communications manager 1207 are implemented at least in part as software stored in a memory. For example, portions of one or more of the components of the communications manager 1207 can be implemented as non-transitory code executable by the processor to perform the functions or operations of the respective component.

The receiver 1210 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communications devices via various channels including control channels (for example, a physical downlink control channel (PDCCH), physical uplink control channel (PUCCH), or PSCCH) and data channels (for example, a physical downlink shared channel (PDSCH), PSSCH, a physical uplink shared channel (PUSCH)). The other wireless communications devices may include, but are not limited to, a base station 102, UE 104, or RSU 510 described with reference to FIG. 5A.

The received information may be passed on to other components of the device 1200. The receiver 1210 may be an example of aspects of the receive processor 356 described with reference to FIG. 3. The receiver 1210 may include a set of radio frequency (RF) chains that are coupled with or otherwise utilize a set of antennas (for example, the set of antennas may be an example of aspects of the antennas 352 described with reference to FIG. 3).

The transmitter 1220 may transmit signals generated by the communications manager 1207 or other components of the wireless communications device 1200. In some examples, the transmitter 1220 may be collocated with the receiver 1210 in a transceiver. The transmitter 1220 may be an example of aspects of the transmit processor 368 described with reference to FIG. 3. The transmitter 1220 may be coupled with or otherwise utilize a set of antennas (for example, the set of antennas may be an example of aspects of the antennas 352 described with reference to FIG. 3), which may be antenna elements shared with the receiver 1210. In some examples, the transmitter 1220 is configured to transmit control information in a PUCCH, PSCCH, or PDCCH and data in a physical uplink shared channel (PUSCH), PSSCH, or PDSCH.

The communications manager 1207 may be an example of aspects of the controller/processor 359 described with reference to FIG. 3. The communications manager 1207 may include the sidelink grant component 1230 and the feedback component 1240. In some implementations, working in conjunction with the receiver 1210 the sidelink grant component 1230 may receiving a sidelink grant allocating sidelink resources for communicating with a second sidelink UE. Additionally, working in conjunction with the sidelink grant component 1230 and the transmitter 1220, the feedback component 1240 may transmit a feedback message based on whether one or both of a first sidelink packet condition or a second sidelink packet condition are satisfied. Furthermore, working in conjunction with the transmitter 1220, the sidelink grant component 1230 may transmit, to another sidelink UE via the sidelink resources, a sidelink packet based on both the first sidelink packet condition and the second sidelink packet being satisfied.

Figure 13:
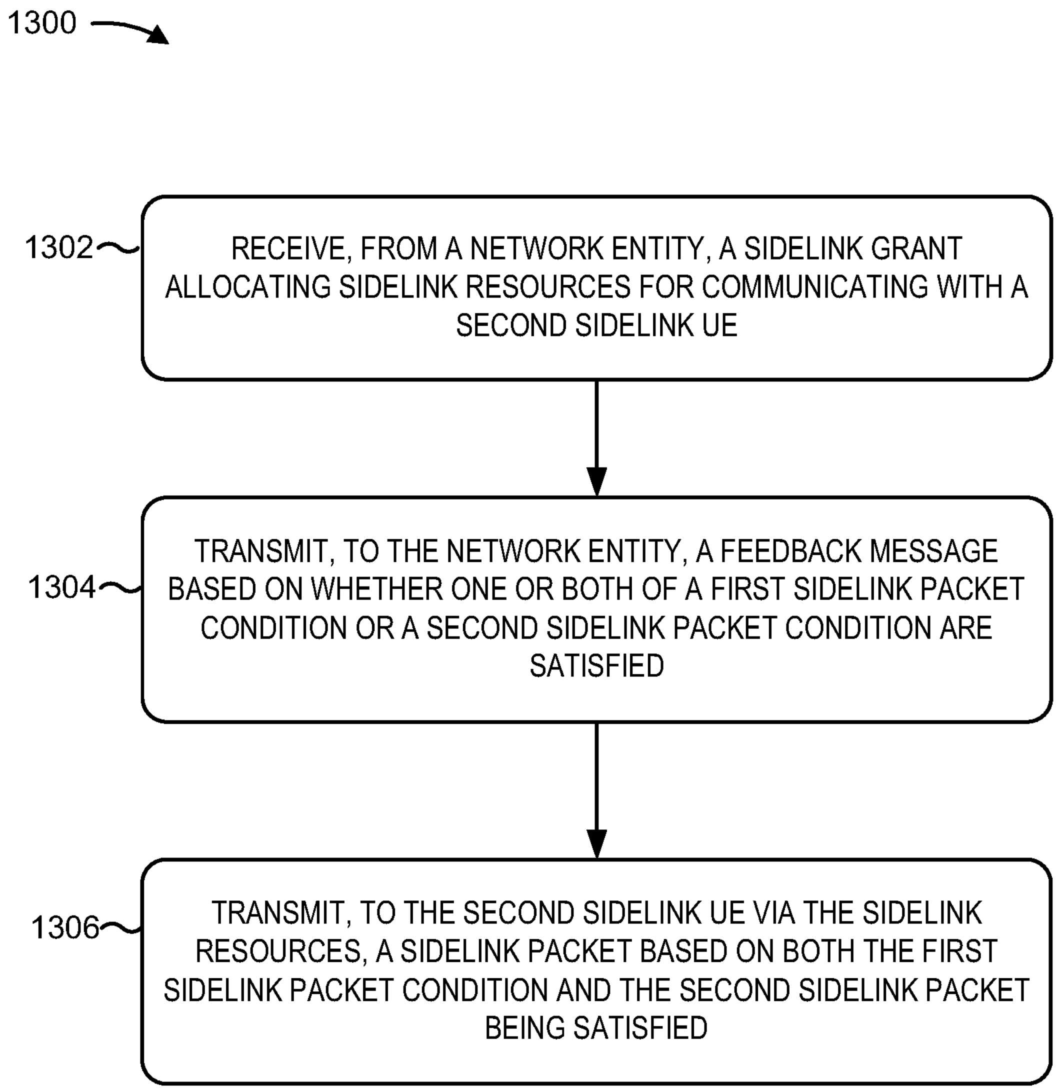
FIG. 13 is a flow diagram illustrating an example of a process performed by a wireless device, in accordance with some aspects of the present disclosure.

FIG. 13 is a flow diagram illustrating an example process 1300 performed by a UE, in accordance with some aspects of the present disclosure. The UE may be an example of a UE 104 described with reference to FIGS. 1, 8, 9, 10, 11A, 11B, and 11C. The example process 1300 is an example of receiving a sidelink grant, such as a proactive grant or a proactive and conditional sidelink grant.

As shown in FIG. 13, the process begins at block 1302 by receiving, from a network entity, a sidelink grant allocating sidelink resources for communicating with a second sidelink UE. At block 1304, the process 1300 transmits, to the network entity, a feedback message based on whether one or both of a first sidelink packet condition or a second sidelink packet condition are satisfied. Finally, at block 1306, the process transmits, to the second sidelink UE via the sidelink resources, a sidelink packet based on both the first sidelink packet condition and the second sidelink packet being satisfied.

Figure 14:
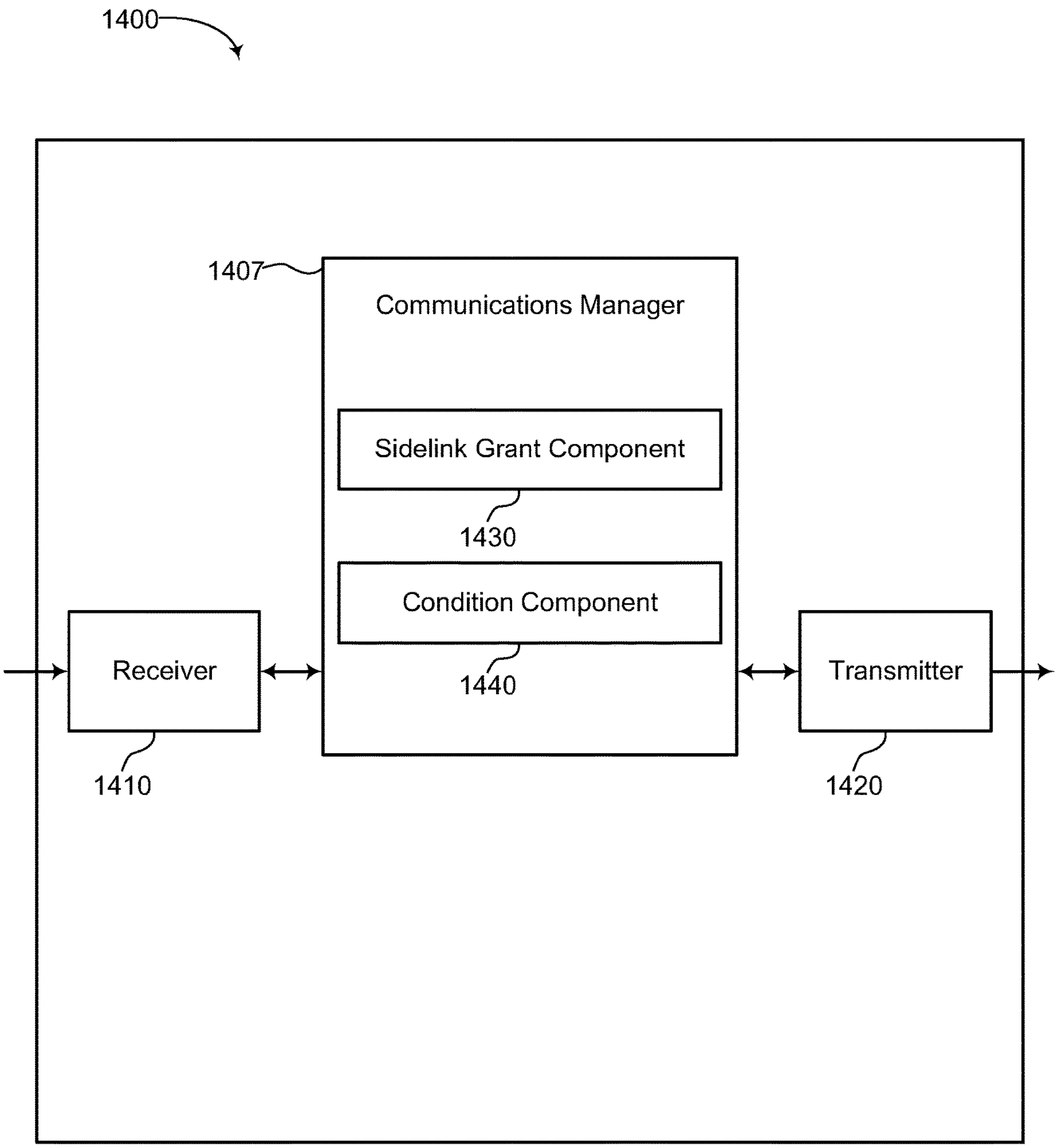
FIG. 14 is a block diagram illustrating an example wireless communication device that supports receiving a sidelink grant, in accordance with aspects of the present disclosure.

FIG. 14 is a block diagram illustrating an example wireless communication device that supports adopting a pre-configured parameter set based on a current connection mode, in accordance with some aspects of the present disclosure. The device 1400 may be an example of aspects of a UE 104 described with reference to FIGS. 1, 7, 8, 9, 10, 11A, 11B, and 11C. The wireless communications device 1400 may include a receiver 1410, a communications manager 1407, a transmitter 1420, a sidelink grant component 1430, and a condition component 1440, which may be in communication with one another (for example, via one or more buses). In some examples, the wireless communications device 1400 is configured to perform operations, including operations of the processes 1500 described below with reference to FIG. 15.

In some examples, the wireless communications device 1400 can include a chip, chipset, package, or device that includes at least one processor and at least one modem (for example, a 5G modem or other cellular modem). In some examples, the communications manager 1407, or its sub-components, may be separate and distinct components. In some examples, at least some components of the communications manager 1407 are implemented at least in part as software stored in a memory. For example, portions of one or more of the components of the communications manager 1407 can be implemented as non-transitory code executable by the processor to perform the functions or operations of the respective component.

The receiver 1410 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communications devices via various channels including control channels (for example, a physical downlink control channel (PDCCH), physical uplink control channel (PUCCH), or PSCCH) and data channels (for example, a physical downlink shared channel (PDSCH), PSSCH, a physical uplink shared channel (PUSCH)). The other wireless communications devices may include, but are not limited to, a base station 102, UE 104, or RSU 510 described with reference to FIG. 5.

The received information may be passed on to other components of the device 1400. The receiver 1410 may be an example of aspects of the receive processor 356 described with reference to FIG. 3. The receiver 1410 may include a set of radio frequency (RF) chains that are coupled with or otherwise utilize a set of antennas (for example, the set of antennas may be an example of aspects of the antennas 352 described with reference to FIG. 3).

The transmitter 1420 may transmit signals generated by the communications manager 1407 or other components of the wireless communications device 1400. In some examples, the transmitter 1420 may be collocated with the receiver 1410 in a transceiver. The transmitter 1420 may be an example of aspects of the transmit processor 368 described with reference to FIG. 3. The transmitter 1420 may be coupled with or otherwise utilize a set of antennas (for example, the set of antennas may be an example of aspects of the antennas 352 described with reference to FIG. 3), which may be antenna elements shared with the receiver 1410. In some examples, the transmitter 1420 is configured to transmit control information in a PUCCH, PSCCH, or PDCCH and data in a physical uplink shared channel (PUSCH), PSSCH, or PDSCH.

The communications manager 1407 may be an example of aspects of the controller/processor 359 described with reference to FIG. 3. The communications manager 1407 may include a sidelink grant component 1430, and a condition component 1440. In some implementations, working in conjunction with the receiver 1410, the sidelink grant component 1430 may receive sidelink grant allocating sidelink resources for a sidelink transmission to a second sidelink UE. The sidelink resources may include sidelink channel resources, uplink channel resources, or downlink channel resources. Furthermore, working in conjunction with the receiver 1410, the condition component 1440 may receive one or more resource conditions for using the sidelink resources allocated via the sidelink grant. Additionally, working in conjunction with the transmitter 1420 and the condition component 1440, the sidelink grant component 1430 may transmit a sidelink packet based on the one or more resource conditions being satisfied.

Figure 15:
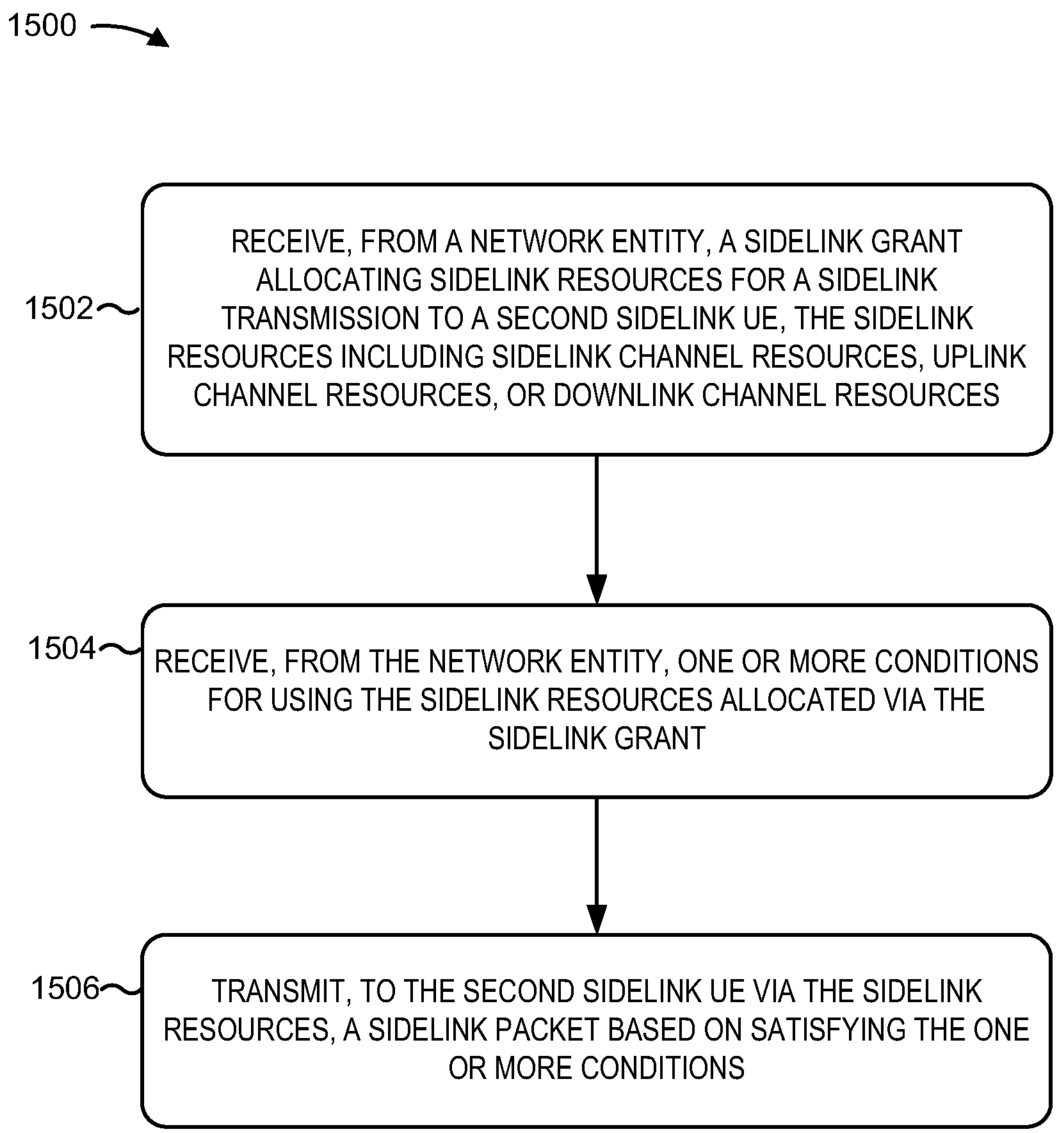
FIG. 15 is a flow diagram illustrating an example of a process performed by a wireless device, in accordance with some aspects of the present disclosure.

FIG. 15 is a flow diagram illustrating an example process 1500 performed by a UE, in accordance with some aspects of the present disclosure. The UE may be an example of a UE 104 described with reference to FIGS. 1, 7, 8, 9, 10, 11A, 11B, and 11C. The example process 1500 is an example of receiving a sidelink grant, such as a conditional grant or a proactive and conditional grant.

As shown in FIG. 15, the process 1500 begins at block 1502 by receiving, from a network entity, a sidelink grant allocating sidelink resources for a sidelink transmission to a second sidelink UE. The sidelink resources may include sidelink channel resources, uplink channel resources, or downlink channel resources. At block 1504, the process 1500 receives, from the network entity, one or more resource conditions for using the sidelink resources allocated via the sidelink grant. Finally, at block 1506, the process 1500 transmits, to the second sidelink UE via the sidelink resources, a sidelink packet based on satisfying the one or more resource conditions.

Implementation examples are described in the following numbered clauses:

Clause 1. A method for wireless communication performed by a first sidelink UE, comprising: receiving, from a network entity, a sidelink grant allocating sidelink resources for communicating with a second sidelink UE; transmitting, to the network entity via uplink resources, a feedback message based on whether one or both of a first sidelink packet condition or a second sidelink packet condition are satisfied; and transmitting, to the second sidelink UE via the sidelink resources, a sidelink packet based on both the first sidelink packet condition and the second sidelink packet being satisfied.

Clause 2. The method of Clause 1, wherein: the first sidelink packet condition is satisfied based on the sidelink packet being stored in a sidelink packet transmission buffer; and the second sidelink packet condition is satisfied based on the sidelink resources being capable of transmitting the sidelink packet based on a size of the sidelink packet.

Clause 3. The method of Clause 2, wherein the feedback message is transmitted based on one or both of the first sidelink packet condition or the second sidelink packet condition not being satisfied.

Clause 4. The method of Clause 3, wherein the feedback message indicates: the sidelink packet transmission buffer is empty; or the sidelink resources are incapable of transmitting the sidelink packet based on the size of the sidelink packet.

Clause 5. The method of Clause 2, wherein the feedback message is transmitted based on both of the first sidelink packet condition and the second sidelink packet condition being satisfied.

Clause 6. The method of any one of Clauses 1-5, wherein the sidelink grant also allocates the uplink resources for transmitting the feedback message; the uplink resources are allocated at a first time that is prior to a second time allocated to the sidelink resources; the first time is at least a first number of symbols after a last symbol associated with the sidelink grant; the second time is at least a second number of symbols after a last symbol associated with the uplink resources; and a sum of the first number of symbols and the second number of symbols is equal to or greater than a sum of a first time for preparing the feedback message transmission and a second time for preparing the sidelink packet transmission.

Clause 7. The method of any one of Clauses 1-6, further comprising receiving, from the network entity, one or more resource conditions for using the sidelink resources, wherein the sidelink resources include sidelink channel resources, uplink channel resources, or downlink channel resources; the sidelink packet is transmitted based on the one or more resource conditions being satisfied; and the one or more resource conditions include a first resource condition that interference toward the network entity is less than or equal to a first interference threshold, a second resource condition that the first sidelink UE beam-forms the transmission of the sidelink packet in a direction indicated by the network entity, a third resource condition that the first sidelink UE uses, for the transmission of the sidelink packet, a precoder that supports multi-user multiple-input multiple-output (MU-MIMO), and a fourth resource condition that interference toward another sidelink UE is less than or equal to a second interference threshold.

Clause 8. The method of any one of Clauses 1-7, further comprising receiving, from the network entity, a sidelink grant configuration message indicating a grant type associated with the sidelink grant.

Clause 9. The method of any one of Clauses 1-8, wherein the first sidelink UE is one sidelink UE of a plurality of sidelink UEs receiving the sidelink grant from the network entity.

Clause 10. The method of Clause 9, wherein the uplink resources associated with the first sidelink UE are orthogonal to respective uplink resources of each sidelink UE of the plurality of sidelink UEs.

Clause 11. The method of Clause 9, wherein the feedback message indicates that the first sidelink UE intends to use the sidelink resources, and the method further comprises receiving, from the network entity, a message indicating that the first sidelink UE can use the sidelink resources based on the feedback message indicating that the first sidelink UE intends to use the sidelink resources.

Clause 12. The method of any one of Clauses 1-11, wherein the sidelink grant further allocates uplink resources for transmitting the feedback message to the network entity.

Clause 13. A method for wireless communication performed by a first sidelink UE, comprising: receiving, from a network entity, a sidelink grant allocating sidelink resources for a sidelink transmission to a second sidelink UE, the sidelink resources including sidelink channel resources, uplink channel resources, or downlink channel resources; receiving, from the network entity, one or more conditions for using the sidelink resources allocated via the sidelink grant; and transmitting, to the second sidelink UE via the sidelink resources, a sidelink packet based on satisfying the one or more conditions.

Clause 14. The method of Clause 13, further comprising transmitting, to the network entity, a BSR indicating a non-empty sidelink packet transmission buffer, wherein the sidelink grant is received based on transmitting the BSR.

Clause 15. The method of any one of Clauses 13-14, wherein the first sidelink UE is one sidelink UE of a plurality of sidelink UEs receiving the sidelink grant from the network entity.

Clause 16. The method of Clause 15, wherein the sidelink grant further allocates uplink resource for transmitting a feedback message, to the network entity, indicating whether the first sidelink UE intends to use the sidelink resources.

Clause 17. The method of Clause 16, wherein the uplink resources associated with the first sidelink UE are orthogonal to respective uplink resources of each sidelink UE of the plurality of sidelink UEs.

Clause 18. The method of any one of Clauses 13-17, wherein the sidelink grant further allocates uplink resources for transmitting a feedback message to the network entity, and the method further comprises transmitting, to the network entity, the feedback message based on whether one or both of a first sidelink packet condition or a second sidelink packet condition are satisfied.

Clause 19. The method of Clause 18, wherein: the first sidelink packet condition is satisfied based on the sidelink packet being stored in a sidelink packet transmission buffer; and the second sidelink packet condition is satisfied based on the sidelink resources being capable of transmitting the sidelink packet based on a size of the sidelink packet.

Clause 20. The method of any one of Clauses 13-19, wherein the one or more resource conditions include a first resource condition that interference toward the network entity is less than or equal to a first interference threshold, a second resource condition that the first sidelink UE beam-forms the transmission of the sidelink packet in a direction indicated by the network entity, a third resource condition that the first sidelink UE uses, for the transmission of the sidelink packet, a precoder that supports multi-user multiple-input multiple-output (MU-MIMO), and a fourth resource condition that interference toward another sidelink UE is less than or equal to a second interference threshold.

The foregoing disclosure provides illustration and description, but is not intended to be exhaustive or to limit the aspects to the precise form disclosed. Modifications and variations may be made in light of the above disclosure or may be acquired from practice of the aspects.

As used, the term “component” is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed by a first sidelink user equipment (UE), comprising:

receiving, from a network entity, a proactive sidelink grant allocating both:

sidelink resources for communicating with a second sidelink UE and uplink control channel resources for transmitting a feedback message, the uplink control channel resources being allocated at a first time that is prior to a second time allocated to the sidelink resources, the proactive sidelink grant being received independently from the first sidelink UE transmitting a buffer status report or a scheduling request to the network entity;

selectively transmitting, to the network entity via the uplink resources in accordance with receiving the proactive sidelink grant, the feedback message indicating whether the first sidelink UE intends to use the sidelink resources based on whether one or both of a first sidelink packet condition or a second sidelink packet condition are satisfied, the first sidelink packet condition and the second sidelink packet condition associated with capabilities of the first sidelink UE to transmit a sidelink packet via the sidelink resources allocated via the proactive sidelink grant, the first sidelink packet condition being satisfied based on the sidelink packet being stored in a sidelink packet transmission buffer, the second sidelink packet condition being satisfied based on a size of the sidelink packet being less than or equal to a size of the sidelink resources; and transmitting, to the second sidelink UE via the sidelink resources, the sidelink packet based on both the first sidelink packet condition and the second sidelink packet condition being satisfied.

2. The method of claim 1, wherein the feedback message is transmitted based on one or both of the first sidelink packet condition or the second sidelink packet condition not being satisfied.

3. The method of claim 2, wherein the feedback message indicates:

the sidelink packet transmission buffer is empty; or the sidelink resources are incapable of transmitting the sidelink packet based on the size of the sidelink packet.

4. The method of claim 1, wherein the feedback message is transmitted based on both of the first sidelink packet condition and the second sidelink packet condition being satisfied.

5. The method of claim 1, wherein:

the first time is at least a first number of symbols after a last symbol associated with the proactive sidelink grant;

the second time is at least a second number of symbols after a last symbol associated with the uplink resources; and a sum of the first number of symbols and the second number of symbols is equal to or greater than a sum of the first time for preparing the feedback message transmission and the second time for preparing the sidelink packet transmission.

6. The method of claim 1, further comprising receiving, from the network entity, one or more resource conditions for using the sidelink resources, wherein:

the sidelink resources include sidelink channel resources, uplink channel resources, or downlink channel resources;

the sidelink packet is transmitted based on the one or more resource conditions being satisfied; and the one or more resource conditions include a first resource condition that interference toward the network entity is less than or equal to a first interference threshold, a second resource condition that the first sidelink UE beam-forms the transmission of the sidelink packet in a direction indicated by the network entity, a third resource condition that the first sidelink UE uses, for the transmission of the sidelink packet, a precoder that supports multi-user multiple-input multiple-output (MU-MIMO), and a fourth resource condition that interference toward another sidelink UE is less than or equal to a second interference threshold.

7. The method of claim 1, further comprising receiving, from the network entity, a sidelink grant configuration message indicating a grant type associated with the proactive sidelink grant.

8. The method of claim 1, wherein the first sidelink UE is one sidelink UE of a plurality of sidelink UEs that receive the proactive sidelink grant from the network entity.

9. The method of claim 8, wherein the uplink resources associated with the first sidelink UE are orthogonal to respective uplink resources of each sidelink UE of the plurality of sidelink UEs.

10. The method of claim 8, wherein the feedback message indicates that the first sidelink UE intends to use the sidelink resources, and the method further comprises receiving, from the network entity, a message indicating that the first sidelink UE can use the sidelink resources based on the feedback message indicating that the first sidelink UE intends to use the sidelink resources.

11. An apparatus for wireless communications at a first sidelink user equipment (UE), comprising:

at least one processor; and at least one memory coupled with the processor and storing instructions operable, when executed by the at least one processor, to cause the apparatus to:

receive, from a network entity, a proactive sidelink grant both:

sidelink resources for communicating with a second sidelink UE and uplink control channel resources for transmitting a feedback message, the uplink control channel resources being allocated at a first time that is prior to a second time allocated to the sidelink resources, the proactive sidelink grant being received independently from the first sidelink UE transmitting a buffer status report or a scheduling request to the network entity;

selectively transmit, to the network entity via uplink resources in accordance with receiving the proactive sidelink grant, the feedback message indicating whether the first sidelink UE intends to use the sidelink resources based on whether one or both of a first sidelink packet condition or a second sidelink packet condition are satisfied, the first sidelink packet condition and the second sidelink packet condition associated with capabilities of the first sidelink UE to transmit a sidelink packet via the sidelink resources allocated via the proactive sidelink grant, the first sidelink packet condition being satisfied based on the sidelink packet being stored in a sidelink packet transmission buffer, the second sidelink packet condition being satisfied based on a size of the sidelink packet being less than or equal to a size of the sidelink resources; and transmit, to the second sidelink UE via the sidelink resources, the sidelink packet based on both the first sidelink packet condition and the second sidelink packet being satisfied.

12. The apparatus of claim 11, wherein the feedback message is transmitted based on one or both of the first sidelink packet condition or the second sidelink packet condition not being satisfied.

13. The apparatus of claim 12, wherein the feedback message indicates:

the sidelink packet transmission buffer is empty; or the sidelink resources are incapable of transmitting the sidelink packet based on the size of the sidelink packet.

14. The apparatus of claim 11, wherein the feedback message is transmitted based on both of the first sidelink packet condition and the second sidelink packet condition being satisfied.

15. A method for wireless communication performed by a first sidelink user equipment (UE), comprising:

receiving, from a network entity, a sidelink grant configuration message indicating a grant type associated with a sidelink grant, the grant type being one of a conditional grant or a conditional and proactive grant, each of the conditional grant and the conditional and proactive grant associated with one or more resource conditions for using the sidelink resources allocated via the sidelink grant;

receiving, from the network entity, a sidelink grant allocating:

sidelink resources for a sidelink transmission to a second sidelink UE; and uplink control channel resources for transmitting a feedback message, to the network entity, indicating whether the first sidelink UE intends to use the sidelink resources, the sidelink resources including sidelink channel resources, uplink channel resources, or downlink channel resources, the uplink control channel resources being allocated at a first time that is prior to a second time allocated to the sidelink resources;

selectively transmitting, to the network entity, the feedback message based on whether one or both of a first sidelink packet condition or a second sidelink packet condition are satisfied, the first sidelink packet condition being satisfied based on the sidelink packet being stored in a sidelink packet transmission buffer, the second sidelink packet condition being satisfied based on a size of the sidelink packet being less than or equal to a size of the sidelink resources;

receiving, from the network entity, the one or more resource conditions for using the sidelink resources allocated via the sidelink grant; and transmitting, to the second sidelink UE via the sidelink resources, a sidelink packet based on satisfying the one or more resource conditions.

16. The method of claim 15, further comprising transmitting, to the network entity, a buffer status report (BSR) indicating a non-empty sidelink packet transmission buffer, wherein the sidelink grant is received based on transmitting the BSR.

17. The method of claim 15, wherein the first sidelink UE is one sidelink UE of a plurality of sidelink UEs receiving the sidelink grant from the network entity.

18. The method of claim 15, wherein the uplink control channel resources associated with the first sidelink UE are orthogonal to respective uplink resources of each sidelink UE of the plurality of sidelink UEs.

19. The method of claim 15, wherein the one or more resource conditions include a first resource condition that interference toward the network entity is less than or equal to a first interference threshold, a second resource condition that the first sidelink UE beam-forms the transmission of the sidelink packet in a direction indicated by the network entity, a third resource condition that the first sidelink UE uses, for the transmission of the sidelink packet, a precoder that supports multi-user multiple-input multiple-output (MU-MIMO), and a fourth resource condition that interference toward another sidelink UE is less than or equal to a second interference threshold.

20. An apparatus for wireless communications at a first sidelink user equipment (UE), comprising:

at least one processor; and at least one memory coupled with the at least one processor and storing instructions operable, when executed by the at least one processor, to cause the apparatus to:

receive, from a network entity, a sidelink grant configuration message indicating a grant type associated with a sidelink grant, the grant type being one of a conditional grant or a conditional and proactive grant, each of the conditional grant and the conditional and proactive grant associated with one or more resource conditions for using the sidelink resources allocated via the sidelink grant;

receive, from the network entity, a sidelink grant allocating:

sidelink resources for a sidelink transmission to a second sidelink UE; and uplink control channel resources for transmitting a feedback message, to the network entity, indicating whether the first sidelink UE intends to use the sidelink resources, the sidelink resources including sidelink channel resources, uplink channel resources, or downlink channel resources, the uplink control channel resources being allocated at a first time that is prior to a second time allocated to the sidelink resources;

transmit, to the network entity, the feedback message based on whether one or both of a first sidelink packet condition or a second sidelink packet condition are satisfied, the first sidelink packet condition being satisfied based on the sidelink packet being stored in a sidelink packet transmission buffer, the second sidelink packet condition being satisfied based on a size of the sidelink packet being less than or equal to a size of the sidelink resources;

receive, from the network entity, the one or more resource conditions for using the sidelink resources allocated via the sidelink grant; and transmit, to the second sidelink UE via the sidelink resources, a sidelink packet based on satisfying the one or more resource conditions.

21. The apparatus of claim 20, wherein:

execution of the instructions further cause the apparatus to transmit, to the network entity, a buffer status report (BSR) indicating a non-empty sidelink packet transmission buffer; and the sidelink grant is received based on transmitting the BSR.

22. The apparatus of claim 20, wherein the one or more resource conditions include a first resource condition that interference toward the network entity is less than or equal to a first interference threshold, a second resource condition that the first sidelink UE beam-forms the transmission of the sidelink packet in a direction indicated by the network entity, a third resource condition that the first sidelink UE uses, for the transmission of the sidelink packet, a precoder that supports multi-user multiple-input multiple-output (MU-MIMO), and a fourth resource condition that interference toward another sidelink UE is less than or equal to a second interference threshold.

* * * * *